United States Patent
Yukimaru et al.

(10) Patent No.: US 9,962,880 B2
(45) Date of Patent: May 8, 2018

(54) BLOW MOLDING DEVICE AND BLOW MOLDING METHOD

(71) Applicant: FTS CO., Ltd., Toyota (JP)

(72) Inventors: Shinji Yukimaru, Aichi Prefecture (JP); Koji Sugiura, Aichi Prefecture (JP); Toshiaki Asahara, Aichi Prefecture (JP); Kouji Ito, Aichi Prefecture (JP)

(73) Assignee: FTS CO., LTD., Toyota, Aichi Prefecture (JP)

( * ) Notice: Subject to any disclaimer, the term of this patent is extended or adjusted under 35 U.S.C. 154(b) by 886 days.

(21) Appl. No.: 14/282,835

(22) Filed: May 20, 2014

(65) Prior Publication Data

US 2015/0014897 A1   Jan. 15, 2015

(30) Foreign Application Priority Data

Sep. 5, 2013   (JP) .................................. 2013-183653

(51) Int. Cl.
 *B29C 49/20* (2006.01)
 *B29C 49/04* (2006.01)
 (Continued)

(52) U.S. Cl.
 CPC .............. *B29C 49/20* (2013.01); *B29C 49/04* (2013.01); *B29C 49/18* (2013.01); *B29C 49/58* (2013.01);
 (Continued)

(58) Field of Classification Search
 None
 See application file for complete search history.

(56) References Cited

U.S. PATENT DOCUMENTS

| 6,837,701 B2 | 1/2005 | Becker et al. |
| 2003/0096034 A1 | 5/2003 | Becker et al. |
| 2010/0092593 A1* | 4/2010 | Aoki ...................... B29C 49/20 |
| | | 425/503 |

FOREIGN PATENT DOCUMENTS

| JP | 08-072129 A | 3/1996 |
| JP | 09-174670 A | 7/1997 |

(Continued)

OTHER PUBLICATIONS

Japanese Office Action dated Apr. 28, 2017 in Japanese Patent Application No. 2013-183653 with and English translation thereof.

*Primary Examiner* — Monica Huson
(74) *Attorney, Agent, or Firm* — McGinn I.P. Law Group, PLLC.

(57) ABSTRACT

A blow molding device and method capable of forming a blow molded article having a built-in part with a good yield rate. The blow molding device has a die core, a blow mold, a parison holding unit and a built-in part holding unit. The parison holding unit has parison expanders and a parison outer holding plate. The built-in part holding unit has an airtight guide tube and a holding rod. After a lower end of a parison is expanded with a plurality of parison expanders, and an upper end of the airtight guide tube is inserted in the lower end of the parison, the lower end of the parison is held between the upper end of the airtight guide tube and the parison outer holding plate, and the pre-blowing is carried out. After the built-in part is positioned in an interior space of the parison, and the parison and built-in part are held between the slide cores, the blow mold is closed and blowing is carried out.

4 Claims, 20 Drawing Sheets

(51) Int. Cl.
 _B29C 49/18_ (2006.01)
 _B29C 49/58_ (2006.01)
 _B29L 31/00_ (2006.01)
 _B29K 101/12_ (2006.01)
 _B29C 47/00_ (2006.01)

(52) U.S. Cl.
 CPC .. _B29C 47/0054_ (2013.01); _B29C 2049/2008_ (2013.01); _B29C 2049/2013_ (2013.01); _B29C 2049/2073_ (2013.01); _B29K 2101/12_ (2013.01); _B29L 2031/7172_ (2013.01)

(56) References Cited

FOREIGN PATENT DOCUMENTS

| JP | 2003-534150 A | 11/2003 |
| JP | 2013-071294 A | 4/2013 |
| WO | WO 01/83192 A1 | 8/2001 |

\* cited by examiner

BLOW MOLDING DEVICE AND BLOW MOLDING METHOD

CROSS-REFERENCE TO RELATED APPLICATION

This application is related to and claims priority from Japanese patent application No. 2013-183653 incorporated herein by reference.

BACKGROUND OF THE INVENTION

1. Field of the Invention

The present invention relates to a blow molding device adapted to form a blow molded article having a built-in part composed of a thermoplastic synthetic resin in an interior space thereof, and a blow molding method.

2. Description of Related Art

Conventionally, tubular blow molded articles, such as fuel tanks for use in automobiles, etc., have been formed of metal, but, in recent years, thermoplastic synthetic resins have been frequently used to form such tubular blow molded articles, because they can effect lightweight automobile bodies, no rust is generated therein, and they can be readily formed into desired configurations.

In many cases, the tubular articles made of thermoplastic synthetic resins have been formed by blow molding, because tubular bodies can be readily formed therewith. Upon blow molding, a parison of a molten thermoplastic synthetic resin is extruded downwardly into a cylindrical configuration, and air is blown into the parison with the parison held with a blow mold, thereby forming the tubular bodies.

On the other hand, upon blow molding, built-in parts such as valves, baffle plates adapted to restrain noise caused by the flowing of fuel, etc. may be required to be provided in interior spaces of the blow molded articles, such as fuel tanks.

In order to provide the built-in parts in the interior spaces of the blow molded articles, a molding device shown in FIG. 1 has been used (see published Japanese patent applications No. Hei 9-174670 and Hei 8-72129, for example.). A built-in part 10 is held in a cavity of a blow mold 12 with a holding rod 14, and a parison 16 is lowered. Then, the blow mold 12 is closed with the built-in part 10 held with slide cores 18, and the parison 16 is pinched with pinching plates 20 to form the blow molded article.

When the dimensions of a built-in part increase, as shown in FIG. 2, a built-in part 22 held with a holding rod 24 is inserted in an interior space of a parison 26, and the built-in part 22 is held between slide cores 28 of a blow mold 30. But, upon inserting of the built-in part 22, it is necessary to prevent the built-in part 22 from contacting an inner wall of the parison 26.

To this effect, the diameter of the parison 26 must be increased. But, when the diameter of the parison 26 increases, the parison 26 is extruded exceeding a required amount for forming the blow molded article, and as a result, the amount of flash around the resulted blow molded article increases to cause a waste of material. In addition, die cores adapted to extrude the parison 26 become large, and a large number of die cores are required.

In order to solve the above-described problem, as shown in FIG. 3, a lower end of a parison 32 extruded from a die core 34 is enlarged with a parison expander 36 below a blow mold 38, and the lower end of the parison 32 is held with a tip end of a built-in part holding unit 40 and a parison holding unit 42. A built-in part 44 is held within an airtight guide tube 46 of the built-in part holding unit 40, and is held with a lower guide plate 48 in an airtight condition.

In this case, as shown in FIG. 4, in the pre-blowing process, the parison 32 is expanded in an airtight condition while holding the parison 32 with the tip end of the built-in part holding unit 40, and by sliding a built-in part holding rod 50, the built-in part 44 can be inserted into the parison 32. Then, the built-in part 44 is held with slide cores 52

However, as shown in FIG. 3, in order to position the built-in part holding unit 40 holding the built-in part 44 below the blow mold 38, and slide the built-in part holding rod 50 upwardly and downwardly, a pit 54 adapted to accommodate the built-in part holding rod 50 having a long shaft must be provided below the blow mold 38 so that a sufficient space is required and accordingly the production costs increase.

SUMMARY OF THE INVENTION

Accordingly, it is an object of the present invention to provide a blow molding device and a blow molding method capable of forming a blow molded article having a built-in part with a good yield rate.

According to a first aspect of the present invention, in a blow molding device for forming a blow molded article having a built-in part in an interior space thereof, the blow molding device includes a die core adapted to extrude a parison, a blow mold adapted to form an outer wall of the blow molded article, a parison holding unit adapted to hold a lower end of the parison and a built-in part holding unit adapted to hold the built-in part prior to blow molding. The die core extrudes the parison and holds an upper end of the parison, the blow mold includes two mold members split along a parting line thereof, the two mold members define a cavity adapted to form the blow molded article in split faces thereof, slide cores are provided in an inner surface of the blow mold so as to be slid inwardly and outwardly of the cavity such that the built-in part and the parison are held between the slide cores, and the outer wall of the blow molded article is molded within the cavity.

The parison holding unit adapted to hold the lower end of the parison is located below the blow mold, and includes a plurality of parison expanders adapted to be inserted in an interior space of the lower end of the parison, and a parison outer holding plate adapted to hold an outer surface of the lower end of the parison. Each of the parison expanders is attached so as to be slidable outwardly from a center of the parison.

The built-in part holding unit includes a built-in part airtight guide tube adapted to hold the built-in part therein, a built-in part holding rod adapted to hold the built-in part in the airtight guide tube so as to be slid upwardly and downwardly, and a lower guide plate having a hole through which the holding rod is slidable, and adapted to close a lower part of the airtight guide tube.

The blow molding device is arranged such that when the blow mold is opened, the lower end of the parison located in the cavity of the blow mold that is opened is expanded with that plurality of parison expanders, after an upper end of the airtight guide tube is inserted in the lower end of the parison, the lower end of the parison is held between the upper end of the airtight guide tube and the parison outer holding plate, the parison is airtightly held with the die core and the parison outer holding plate, and is inflated to carry out pre-blowing, after the parison is subjected to pre-blowing, the built-in part is slid from the airtight guide tube to the interior space of the parison with the holding rod so as to hold the built-in part in a position facing the cavity, when the blow mold is closed, the built-in part is positioned in the interior space of the parison, after the parison and the built-in part are held between the slide cores, the holding rod is slid and removed from the blow mold, and when the blow mold is completely closed, and an upper part and a lower part of the parison are held between an upper end and a lower end of the blow mold, blowing is carried out with the blow mold.

In the first aspect, the blow molding device includes a die core adapted to extrude a parison, a blow mold adapted to form an outer wall of the blow molded article, a parison holding unit adapted to hold a lower end of the parison and a built-in part holding unit adapted to hold the built-in part prior to blow molding. With this arrangement, a lower end of the parison extruded from the die core is held and enlarged prior to blow molding so that a built-in part can be inserted within the parison, whereby a blow molded article having the built-in part in an interior space thereof can be obtained.

The die core extrudes the parison and holds an upper end thereof so that the upper end of the parison can be held airtightly.

The blow mold includes two mold members split along a parting line thereof, the two mold members define a cavity adapted to form the blow molded article in split faces thereof, and slide cores are provided in an inner surface of the blow mold so as to be slidable inwardly and outwardly of the cavity. With this arrangement, the built-in part are held within the parison with the slide cores, whereby the blow molded article having the built-in part that is located in a predetermined position can be molded within the cavity.

The parison holding unit adapted to hold a lower end of the parison is located below the blow mold. The parison holding unit includes a plurality of parison expanders adapted to be inserted in an interior space of the lower end of the parison, and a parison outer holding plate adapted to hold an outer surface of the lower end of the parison. Each of the parison expanders is attached so as to be slidable outwardly from a center of the parison. Therefore, the lower end of the parison can be opened with the parison expanders so that the airtight guide tube can be inserted within the lower end of the parison. As a result, when pre-blowing is carried out to inflate the parison, and the built-in parts are inserted into the parison, the built-in parts can be prevented from contacting the inner wall of the parison.

The built-in part holding unit includes a built-in part airtight guide tube adapted to hold the built-in part therein, a built-in part holding rod adapted to hold the built-in part in the airtight guide tube so as to be slidable upwardly and downwardly, and a lower guide plate having a hole through which the holding rod is slidable, and adapted to close a lower part of the airtight guide tube. Therefore, the lower guide plate can hold the built-in part within the airtight guide tube so as to slide upwardly and downwardly therein, and make the airtight guide tube airtight.

In addition, the built-in part may be held within the airtight guide tube so that the built-in part having a wide width can be used. Furthermore, by determining the waiting position of the built-in part prior to insertion in the airtight guide tube, the dimensions of the built-in part can be readily changed.

When the blow mold is opened, the lower end of the parison located in the cavity of the blow mold that is opened is expanded with the plurality of parison expanders. Therefore, the lower end of the parison can be expanded so that in order to insert the built-in part into the parison, it is unnecessary to enlarge the outside diameter of the parison, thereby reducing the material for the parison.

After an upper end of the airtight guide tube is inserted in the lower end of the parison, the lower end of the parison is held between the upper end of the airtight guide tube and the parison outer holding plate, the parison is airtightly held with the die core and the parison outer holding plate, and is inflated to carry out pre-blowing, and the built-in part is slid from the airtight guide tube to the interior space of the parison with the holding rod so as to hold the built-in part in a position facing the cavity. Since the outside diameter of the parison enlarges, the built-in part is prevented from contacting the inner wall of the parison upon inserting of the built-in part so that the built-in part can be positioned in a prescribed position of the cavity with the holding rod.

When the blow mold is closed, the built-in part is positioned in the interior space of the parison, after the parison and the built-in part are held between the slide cores, the holding rod is slid and removed from the blow mold, and when the blow mold is completely closed, and an upper part and a lower part of the parison are held between an upper end and a lower end of the blow mold, blowing is carried out with the blow mold. With this arrangement, blow molding is carried out with the upper part and the lower part of the parison closed with the blow mold and with the built-in part positioned in a prescribed position of the cavity so that the blow molded article having the built-in part positioned in a prescribed position can be obtained.

According to a second aspect of the present invention, the airtight guide tube includes a parison holding section of which an upper part is adapted to contact the lower end of the parison for holding the lower end of the parison with the parison holding unit, and a bellows part is provided in the airtight guide tube between the parison holding section and the lower guide plate so as to be extendable and contractable upwardly and downwardly.

When the blow mold is opened, and after the upper end of the airtight guide tube is inserted in the lower end of the parison, the lower end of the parison is held between the parison holding section of the airtight guide tube and the parison outer holding plate, the parison is held with the parison outer holding plate airtightly, and the parison is inflated, thereby carrying out pre-blowing.

After the pre-blowing of the parison, the bellows part of the airtight guide tube is compressed and the holding rod is slid to locate the built-in part within the parison from the airtight guide tube so that the built-in part is held in the position facing the cavity. When the blow mold is closed, and after the built-in part is located within the parison, and the parison and the built-in part are held between the slide cores, the holding rod is arranged so as to be slid and removed, and when the blow mold is closed completely, the upper part and the lower part of the parison is held between the upper end and the lower end of the blow mold, and the blowing is carried out.

In the second aspect of the present invention, the airtight guide tube includes a parison holding section of which an upper part is adapted to contact the lower end of the parison for holding the lower end of the parison with the parison holding unit, and a bellows part is provided in the airtight guide tube between the parison holding section and the lower guide plate so as to be extendable and contractable upwardly and downwardly. Therefore, when the built-in part is inserted into the parison, the bellows part contracts with the sliding of the holding rod so that the sliding distance of the holding rod can be reduced to make a space for sliding of the holding rod small, whereby a special pit is not needed around the built-in part holding unit.

When the blow mold is opened, and after the upper end of the airtight guide tube is inserted in the lower end of the parison, the lower end of the parison is held between the parison holding section of the airtight guide tube and the parison outer holding plate, the parison is held with the die core and the parison outer holding plate airtightly, and the parison is inflated, thereby carrying out pre-blowing. Since the outside diameter of the parison is inflated, upon inserting of the built-in part, the built-in part can be located in a predetermined position of the cavity with the holding rod without contacting the inner wall of the parison. The upper end of the parison can be held with the die core or the upper pinching plate airtightly.

After the parison is subjected to pre-blowing, the bellows part of the airtight guide tube is compressed, and the built-in part holding rod is slid to position the built-in part in the interior space of the parison from the airtight guide tube and hold the built-in part in the position facing the cavity. Since the bellows part of the airtight guide tube is compressed, the sliding distance of the holding rod can be reduced, and since the outside diameter of the parison is inflated, upon inserting of the built-in part, the built-in part can be positioned in a predetermined position of the cavity with the holding rod without contacting the inner wall of the parison.

According to a third aspect of the present invention, when the bellows part of the airtight guide tube is compressed to position the built-in part in the position facing the cavity, air within the airtight guide tube is fed into the parison to further inflate the parison.

In the third aspect of the present invention, the bellows part of the airtight guide tube is compressed to position the built-in part in the position facing the cavity, air within the airtight guide tube is fed into the parison to further inflate the parison. With this arrangement, the built-in part can be inserted into the parison more securely without contacting the parison.

According to a fourth aspect of the present invention, preblow injection ports adapted to inject gas when the upper end of the airtight guide tube and the parison outer holding plate hold the lower end of the parison are provided at upper ends of the parison expanders.

In the fourth aspect of the present invention, preblow injection ports adapted to inject gas when the upper end of the airtight guide tube and the parison outer holding plate hold the lower end of the parison are provided at upper ends of the parison expanders. With this arrangement, gas is injected from the preblow injection ports provided at the upper ends of the parison expanders with the lower end of the parison held between the upper end of the airtight guide tube and the parison outer holding plate so that the parison can be inflated during pre-blowing, thereby facilitating the insertion of the built-in part into the parison.

According to a fifth aspect of the present invention, the parison expanders are provided so as to contact the upper end of the airtight guide tube with a slide mechanism, and recesses adapted to accommodate the parison expanders are formed at the upper end of the airtight guide tube.

In the fifth aspect of the present invention, the parison expanders are provided so as to contact the upper end of the airtight guide tube with a slide mechanism, and recesses adapted to accommodate the parison expanders are formed at the upper end of the airtight guide tube. With this arrangement, when the parison outer holding plate holds the outside of the lower end of the parison, outside surfaces of the parison expanders and the built-in part airtight guide tube become integral with each other, thereby holding the inside of the parison airtightly.

According to a sixth aspect of the present invention, the parison outer holding plate is split into two split plates so as to be respectively moved by a cylinder toward an end face of the airtight guide tube to contact the same.

In the sixth aspect of the present invention, the parison outer holding plate is split into two split plates so as to be respectively moved by a cylinder toward an end face of the airtight guide tube to contact the same. With this arrangement, the lower end of the parison can be securely and airtightly held with the parison outer holding plate and the airtight guide tube.

According to a seventh aspect of the present invention, in a blow molding method for forming a blow molded article having a built-in part in an interior space thereof, the blow molding method uses a die core adapted to extrude a parison, a blow mold adapted to form an outer wall of the blow molded article, a parison holding unit adapted to hold a lower end of the parison, and a built-in part holding unit adapted to hold the built-in part prior to blow molding.

The blow mold includes two mold members split along a parting line thereof, and the two mold members define a cavity adapted to form the blow molded article in split faces thereof. Slide cores are provided in an inner surface of the blow mold so as to be slid inwardly and outwardly of the cavity.

The parison holding unit includes a plurality of parison expanders adapted to be inserted in an interior space of the lower end of the parison, and a parison outer holding plate adapted to hold an outer surface of the lower end of the parison, and each of the parison expanders is attached so as to slide outwardly from a center of the parison.

The built-in part holding unit includes a built-in part airtight guide tube adapted to hold the built-in part therein, a built-in part holding rod adapted to hold the built-in part in the airtight guide tube so as to slide the built-in part upwardly and downwardly, and a lower guide plate having a hole through which the holding rod is slidable, and adapted to close the airtight guide tube.

The blow molding method includes the steps of opening the blow mold along the parting line, dropping the parison from the die core in the cavity that is opened, expanding the lower end of the parison with the plurality of parison expanders, inserting an upper end of the airtight guide tube into the lower end of the parison, holding the lower end of the parison between the upper end of the airtight guide tube and the parison outer holding plate, holding the parison in an airtight condition with the die core and the parison outer holding plate, inserting gas into the parison to inflate the same to carry out pre-blowing, holding the built-in part with the holding rod from the airtight guide tube, positioning the built-in part in a position facing the cavity, closing the blow mold to hold the parison and the built-in part with the slide cores, removing the holding rod from the blow mold, closing the blow mold completely, and holding an upper part and a lower part of the parison with an upper end and a lower end of the blow mold, and blowing gas into the parison, thereby forming the blow molded article.

In the seventh aspect of the present invention, the blow molding method uses a die core adapted to extrude a parison, a blow mold adapted to form an outer wall of the blow molded article, a parison holding unit adapted to hold a lower end of the parison, and a built-in part holding unit adapted to hold the built-in part prior to blow molding. With this method, the parison extruded with the die core is held prior to blow molding at a lower end thereof so that the lower end of the parison can be enlarged.

The blow mold includes two mold members split along a parting line thereof, the two mold members define a cavity adapted to form the blow molded article in split faces thereof, and slide cores are provided in an inner surface of the blow mold so as to be slid inwardly and outwardly of the cavity. With this method, the built-in part is held with the slide cores within the parison, whereby the blow molded article having the built-in part at a predetermined position can be formed within the cavity.

The parison holding unit includes a plurality of parison expanders adapted to be inserted in an interior space of the lower end of the parison, and a parison outer holding plate adapted to hold an outer surface of the lower end of the parison, and each of the parison expanders is attached so as to slide laterally with respect to the parison. With this method, the lower end of the parison can be opened with the parison expanders, the upper end of the airtight guid tube can be securely inserted into the lower end of the parison so that the built-in part can be prevented from contacting the inner wall of the parison when the built-in part is inserted within the parison after the pre-blowing is carried out, and the parison is inflated.

The built-in part holding unit includes a built-in part airtight guide tube adapted to hold the built-in part therein, a built-in part holding rod adapted to hold the built-in part in the airtight guide tube so as to slide the built-in part upwardly and downwardly, and a lower guide plate having a hole through which the holding rod is slidable, and adapted to close the airtight guide tube. With this method, the airtight guide tube can hold the built-in part so as to slide the same upwardly and downwardly, and the airtight guide tube can be made airtight.

And, the built-in part may be held within the airtight guide tube so that the built-in part with various dimensions can be used. In addition, by determining the waiting position of the built-in part prior to insertion in the airtight guide tube, the specification of the built-in part can be readily changed.

After the blow mold is opened along the parting line, the parison is dropped from the die core in the cavity that is opened, and the lower end of the parison is expanded with the plurality of parison expanders, an upper end of the airtight guide tube is inserted in the lower end of the parison. With this method, the lower end of the parison can be enlarged so that it is unnecessary to enlarge the outside diameter of the parison for inserting the built-in part into the lower end of the parison, whereby the volume of the material for the parison can be reduced.

After the lower end of the parison is held between the upper end of the airtight guide tube and the parison outer holding plate, the parison is airtightly held with the die core and the parison outer holding plate, and gas is inserted in the interior space of the parison to inflate the same, thereby carrying out pre-blowing, the built-in part is positioned in the interior space of the parison from the airtight guide tube with the built-in part held with the holding rod. With this method, the outside diameter of the parison is expanded so that upon insertion of the built-in part, it can be positioned in a predetermined position of the cavity with the holding rod without contacting the inner wall of the parison.

When the built-in part is held in a position facing the cavity, and the blow mold is closed, the built-in part is positioned within the parison, and after the parison and the built-in part are held between the slide cores, the holding rod is removed from the blow mold, after the blow mold is closed completely, and an upper part and a lower part of the parison are held between an upper end and a lower end of the blow mold, the upper part and the lower part of the parison are closed with the blow mold, and gas is blown into the parison, thereby forming the blow molded article. With this method, the blow molded article in which the built-in part is located in a predetermined position without slipping within the parison can be obtained. Then, the blow mold is opened to remove the blow molded article from the cavity.

According to an eighth aspect of the present invention, the airtight guide tube includes a parison holding section of which an upper part is adapted to contact the lower end of the parison for holding the lower end of the parison with the parison holding unit, and a bellows part is provided in the airtight guide tube between the parison holding section and the lower guide plate so as to be extendable and contractable upwardly and downwardly.

The blow molding method of the eighth aspect of the present invention includes the steps of opening the blow mold along the parting line, dropping the parison from the die core in an open part of the cavity, inserting the upper end of the airtight guide tube into the lower end of the parison, and holding the lower end of the parison between the parison holding section of the airtight guide tube and the parison holding unit, inserting gas into the parison to inflate the parison, thereby carrying out pre-blowing, compressing the bellows part of the airtight guide tube, and sliding the built-in part holding rod to position the built-in part in the interior space of the parison from the airtight guide tube and hold the built-in part in the position facing the cavity.

In the eighth aspect of the present invention, the airtight guide tube includes a parison holding section of which an upper part is adapted to contact the lower end of the parison for holding the lower end of the parison with the parison holding unit, and a bellows part is provided in the airtight guide tube between the parison holding section and the lower guide plate so as to be extendable and contractable upwardly and downwardly. With this method, when the built-in par is inserted into the parison, the bellows part contracts with the sliding of the built-in part holding rod so that the sliding length of the built-in part holding rod can be decreased to make a space required for sliding the built-in part holding rod small, whereby a special pit is not needed around the built-in part holding unit.

The blow mold is opened along the parting line, the parison is dropped from the die core in an open part of the cavity, and the parison holding section of the airtight guide tube is inserted into the lower end of the parison. With this method, the lower end of the parison can be held so that when the built-in part is inserted, the parison is prevented from deforming, and the built-in part is prevented from contacting the parison.

After the lower end of the parison is held between the parison holding section of the airtight guide tube and the parison holding unit, and gas is inserted into the parison to inflate the parison, thereby carrying out pre-blowing, the bellows part of the airtight guide tube is compressed, and the built-in part holding rod is slid to position the built-in part in the interior space of the parison from the airtight guide tube, and hold the built-in part in the position facing the cavity. With this method, the outside diameter of the parison is inflated so that when the built-in part is inserted, the built-in part can be positioned in a predetermined position of the cavity by means of the holding rod without contacting the inner wall of the parsion.

According to a ninth aspect of the present invention, the blow molding method further includes the step of feeding air within said airtight guide tube into the parison when said bellows part of said airtight guide tube is compressed to position the built-in part in the position facing said cavity, thereby further inflating the parison.

In the ninth aspect of the present invention, when the bellows part of the airtight guide tube is compressed to position the built-in part in the position facing the cavity, air within the airtight guide tube is fed into the parison to further inflate the parison. With this method, the built-in part can be inserted into the parison more securely without contacting the parison.

According to a tenth aspect of the present invention, the blow molding method further includes the step of injecting gas from preblow injection ports provided at upper ends of the parison expanders to carry out pre-blowing after the lower end of the parison is held between the upper end of the airtight guide tube and the parison outer holding plate.

In the tenth aspect of the present invention, the preblowing is carried out by injecting gas from preblow injection ports provided at upper ends of the parison expanders after the lower end of the parison is held between the upper end of that airtight guide tube and the parison outer holding plate. With this method, the parison can be inflated by pre-blowing with the lower end of the parison held between the upper end of the airtight guide tube and the parison outer holding plate, thereby facilitating the insertion of the built-in part into the parison.

According to an eleventh aspect of the present invention, the blow molding method further include the step of forming recesses adapted to accommodate the parison expanders at the upper end of the airtight guide tube such that after the parison expanders are accommodated in the recesses of the airtight guide tube with a slide mechanism, the upper end of the airtight guide tube and the parison expanders contact an inner surface of the parison, whereas the outer holding plate contacts an outer surface of the parison, thereby holding the lower end of the parison.

In the eleventh aspect of the present invention, recesses adapted to accommodate the parison expanders are formed at the upper end of the airtight guide tube, after the parison expanders are accommodated in the recesses of the airtight guide tube with a slide mechanism, the upper end of the airtight guide tube and the parison expanders contact an inner surface of the parison, whereas the outer holding plate contacts an outer surface of the parison, thereby holding the lower end of the parison. With this method, the parison expanders become integral with the airtight guide tube, and contact the inner surface of the parison to hold an airtight condition against the parison, whereas the outer holding plate contacts an outer surface of the parison, thereby holding the lower end of the parison.

According to a twelfth aspect of the present invention, the blow mold method further includes the step of splitting the parison outer holding plate into two split plates so as to be respectively moved by a cylinder toward an end face of the airtight guide tube to contact the same.

In the twelfth aspect of the present invention, the parison outer holding plate is split into two split plates so as to be respectively moved by a cylinder toward an end face of the airtight guide tube to contact the same. With this method, the lower end of the parison can be securely held between the parison outer holding plate and the airtight guide tube in an airtight condition.

In accordance with the present invention, the die core extrudes the parison and holds an upper end thereof so that the upper end of the parison can be held airtightly, and the built-in part holding unit includes an airtight guide tube, a holding rod, and a lower guide plate so that the airtight guide tube holds the built-in part therein so as to be slid upwardly and downwardly, and pre-blowing can be carried out by making the airtight guide tube airtight.

When the lower end of the parison is held between the upper end of the airtight guide tube and the outer holding plate, and the built-in part is inserted into the parison that is inflated, the built-in part can be positioned in a predetermined position of the cavity by means of the built-in part holding rod without contacting the inner wall of the parison.

Other objects, features, and characteristics of the present invention will become apparent upon consideration of the following description and the appended claims with reference to the accompanying drawings, all of which form a part of this specification.

DETAILED DESCRIPTION OF THE PREFERRED EMBODIMENTS

Hereinafter, a first embodiment of a blow molding device of the present invention will be explained based on a blow molding device adapted to form an automobile fuel tank as a blow molded article with reference to FIG. 5 through FIG. 16. The present invention will be explained with reference to a blow molding device for forming a fuel tank 56 having a built-in part 58, but can be applied to another blow molded article having another built-in part. A second embodiment of a blow molding device of the present invention will be explained with reference to FIG. 17 through FIG. 23.

Figure 1:
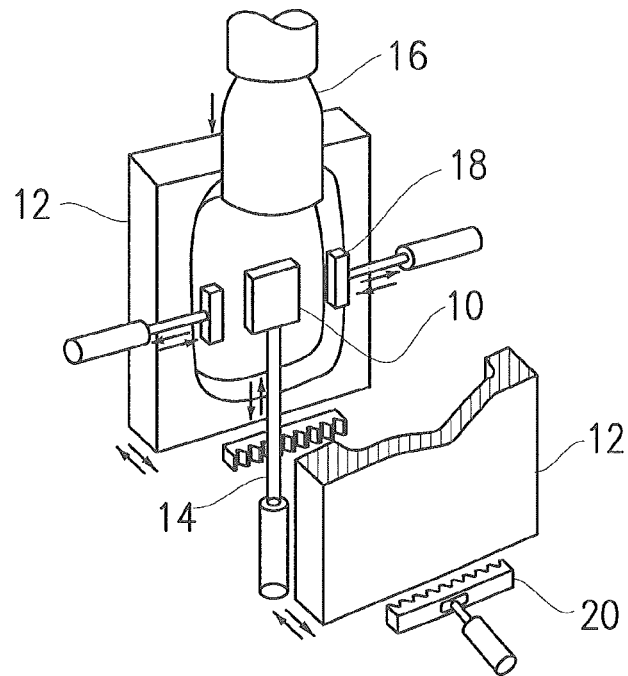
FIG. 1 is a perspective view of one example of a conventional blow molding device adapted to form a blow molded article.
Figure 2:
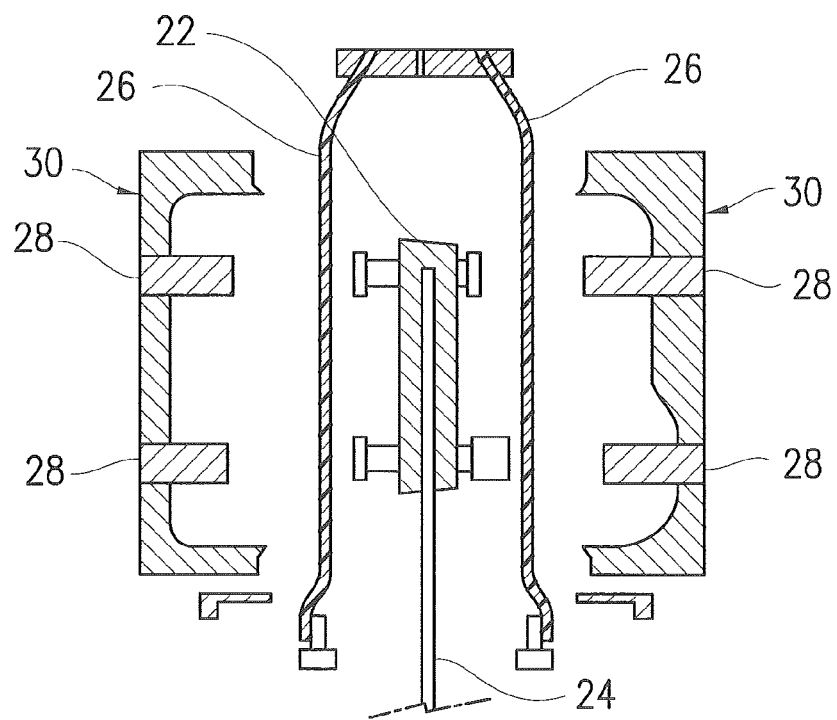
FIG. 2 is a sectional view showing a conventional method of forming a blow molded article with another example of a conventional blow molding device, which shows a state wherein a parison enters an interior space of a blow mold.
Figure 3:
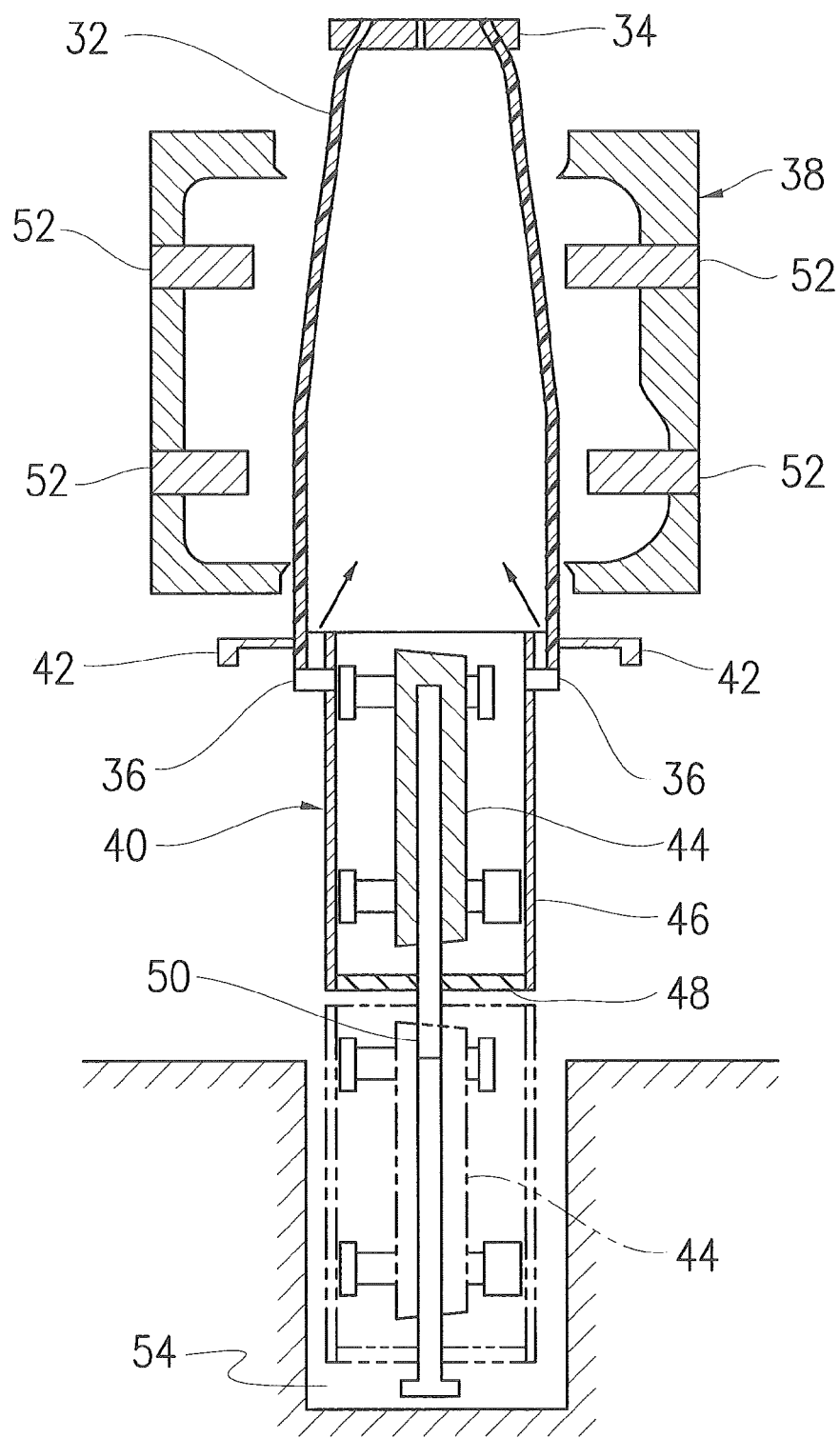
FIG. 3 is a sectional view showing a conventional method of forming a blow molded article with another example of a conventional blow molding device, which shows a state wherein a lower end of the parison is held between a parison outer holding plate and an upper end of a built-in part airtight guide tube, and pre-blowing is carried out.
Figure 4:
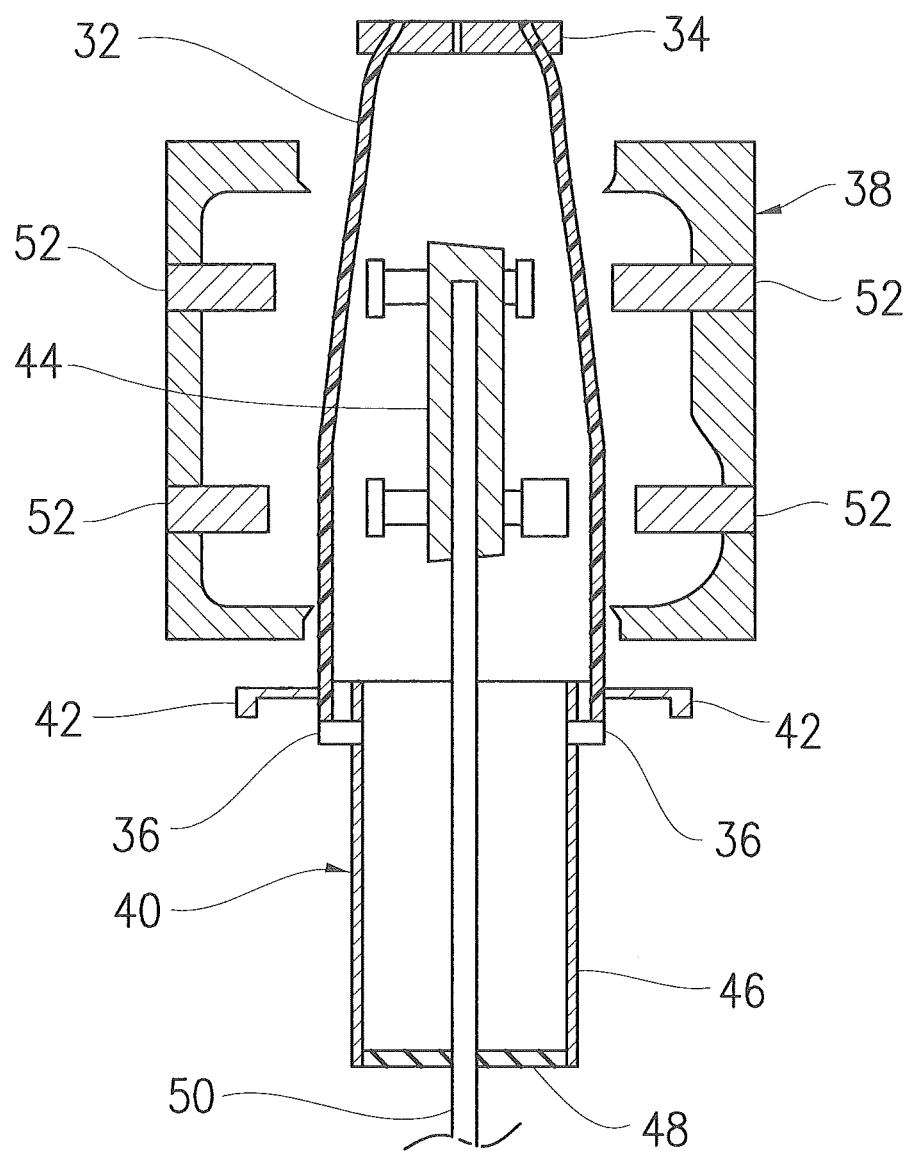
FIG. 4 is a sectional view showing a conventional method of forming a blow molded article with another example of a conventional blow molding device, which shows a state wherein a built-in part is inserted into the parison with slide cores.
Figure 5:
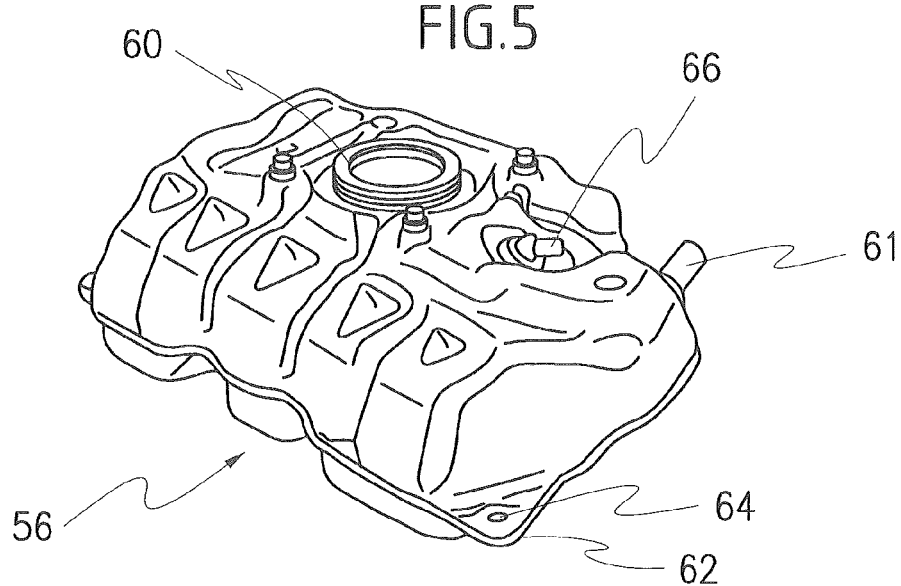
FIG. 5 is a perspective view of a fuel tank in one embodiment in accordance with the present invention.

FIG. 5 is a perspective view of a fuel tank 56 that is formed using a blow molding device of the present embodiment.

As shown, the fuel tank 56 formed with the blow molding device of the present embodiment has a pump unit mounting hole 60 for inserting a fuel pump (not shown), etc. into the fuel tank 56 in an upper surface thereof. And, a fuel inlet hole 61 is provided in a side surface or the upper surface of the fuel tank 56 for injecting fuel from an inlet pipe (not shown).

And, an outer circumferential rib 62 is provided around the fuel tank 56 over an entire length thereof, and a plurality of tank mounting holes 64 are formed in the outer circumferential rib 62 in predetermined positions such as corners, etc. thereof. By bolting the tank mounting holes 64 and a vehicle body together, the fuel tank 56 is mounted on the vehicle body.

In addition, mounting holes 66 are provided in the upper surface of the fuel tank 56 for connecting hoses, etc. adapted to collect evaporated fuel from an interior space of the tank, etc. thereto.

The fuel tank 56 is formed using a blow molding device of the present embodiment. An outer wall of the fuel tank 56 is formed by blow molding into a single layer or multiple layers. In the case of the multiple layers, the outer wall includes a skin layer, an exterior main layer, an exterior adhesive layer, a barrier layer, an interior adhesive layer and an interior main layer.

Pillar members adapted to reinforce the fuel tank 56, baffle plates adapted to prevent occurrences of waving of fuel, a fuel pump, box-shaped members adapted to mount canister, etc. are attached inside the fuel tank 56 as built-in parts 58. The built-in part 58 can be composed of a thermoplastic synthetic resin exhibiting a fuel oil resistance, such as polyacetal, high-density polyethylene (HDPE), etc. With this arrangement, the strength of the fuel tank 56 can be improved, and the rigidity of the fuel tank 56 is not reduced due to swelling by fuel oil, etc. if the built-in part 58 is attached in the interior space of the fuel tank 56.

The blow molding device of the first embodiment and the method for forming the blow molded fuel tank 56 using the blow molding device will be explained with reference to FIGS. 6 through 16. The blow molding device has a die core 68 adapted to extrude a parison 70, a blow mold 72 adapted to mold a blow molded article, a parison holding unit 74 adapted to hold a lower end of the parison 70 and a built-in part holding unit 75 adapted to hold the built-in part 58 in an interior space of an airtight guide tube 76, and insert the same in an interior space of the parison 70 within the blow mold 72.

The die core 68 extrudes the parison 70, and when the blow mold 72 is opened, the die core 68 positions the parison 70 within the blow mold 72, and holds the upper end of the parison 70 to prevent flowing of air out of the parison 70 upon pre-blowing, as described later.

Figure 6:
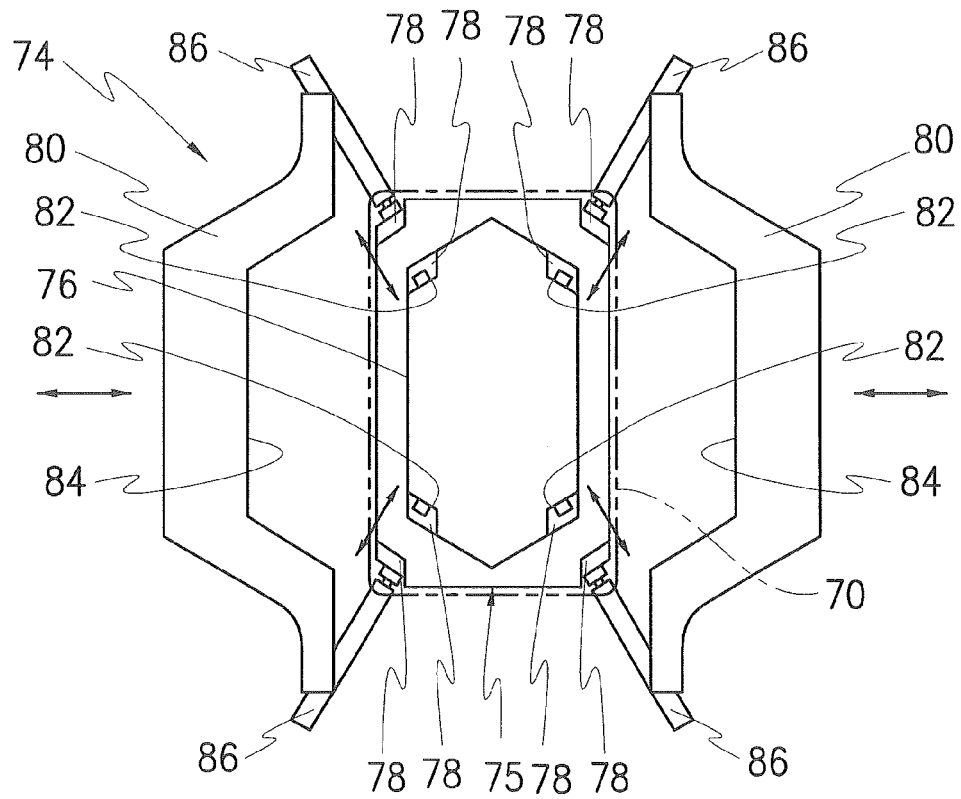
FIG. 6 is a top view of a parison holding unit and a built-in part holding unit in one embodiment in accordance with the present invention.

First, the parison holding unit 74 will be explained with reference to FIGS. 6, 8 and 10.

The parison holding unit 74 adapted to hold the lower end of the parison 70 is provided below the blow mold 72, and the parison holding unit 74 has a parison expander 78 adapted to be inserted in an interior space of the lower end of the parison 70, which projects from a lower end of the blow mold 72, and a parison outer holding plate 80 adapted to hold an outer surface of the lower end of the parison 70.

A plurality of parison expanders 78 are provided so as to expand the lower end of the parison 70. In the present embodiment, four parison expanders 78 are provided so as to face four corners of a later-described airtight guide tube 76. When the parison expanders 78 contact the airtight guide tube 76, they are accommodated in recesses 82 provided in the airtight guide tube 76 to become integral therewith, and consequently, define outer surfaces flush with the outer surface of the airtight guide tube 76, thereby holding an inner surface of the parison 70 in an airtight condition.

The parison expanders 78 are attached so as to be movable outwardly from a center, namely in directions perpendicular to the parison 70, with parison cylinders 86. And the parison expanders 78 contact an inner surface of the lower end of the parison 70. By moving the parison cylinders 86 backwardly, the inside diameter of the parison 70 can be enlarged.

The parison expanders 78 can continuously expand the lower end of the parison 70 so as not to be crushed. When an upper end of the airtight guide tube 76 is inserted in the interior space of the parison 70, the inner surface of the parison 70 is enlarged so as to contact the outer surface of the upper end of the airtight guide tube 76.

Figure 12:
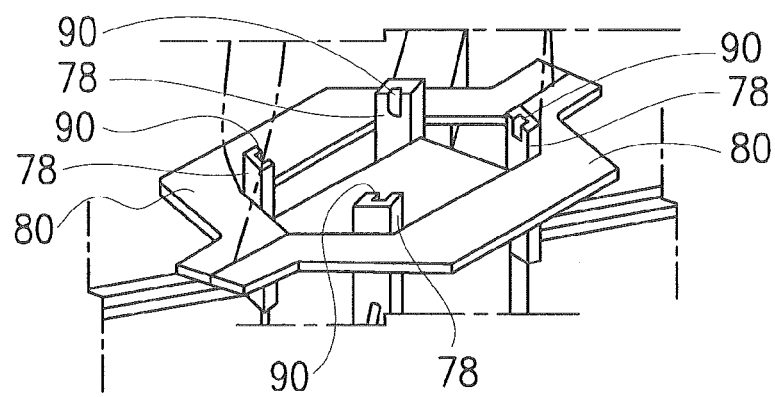
FIG. 12 is a schematic perspective view showing upper ends of parison expanders in a state wherein the parison holding unit and the built-in part holding unit of the first embodiment of the present invention hold the parison in their upper parts.

As shown in FIG. 12, pre-blow outlet ports 90 are provided at ends of the parison expanders 78 for injecting gas such as air in the interior space of the parison 70.

The parison outer holding plate 80 has a recess 84 conforming to the configuration of an outer periphery of the airtight guide tube 76 and an outer periphery of the parison expander 78. With this arrangement, the lower end of the parison 70 can be held between the parison expander 78, the airtight guide tube 76 and the parison outer holding plate 80. The parison outer holding plate 80 is formed so as to be split into a plurality of plates, each being formed so as to slide for holding the lower end of the parison 70, respectively. In the present embodiment, the parison outer holding plate 80 is formed so as to be split into two plates. Alternatively, it may be formed so as to be split into three or more plates.

When the parison outer holding plate 80 is slid towards the airtight guide tube 76 (towards a center of the parison 70), the outer periphery of the lower end of the parison 16 is pressed to securely hold the parison 70 with the upper end of the airtight guide tube 76, the parison expander 78 and the parison outer holding plate 80. As a result, gas can be prevented from leaking therebetween so that the lower end of the parison 70 can be prevented from being crushed. In addition, the volume of the interior space of the parison 70 can be maintained large so that a sufficient amount of gas can be airtightly enclosed therein. Therefore, the pre-blowing process of slightly inflating the parison 70 can be carried out prior to the blowing process of bringing the parison 70 into close contact with the blow mold.

Next, the built-in part holding unit 75 will be explained with reference to FIG. 6 and FIG. 10. The built-in part holding unit 75 has the airtight guide tube 76, a built-in part holding rod 88 adapted to hold the built-in part 58 in an interior space of the airtight guide tube 76 and move upwardly and downwardly so as to insert the built-in part 58 in the parison 70, and a lower guide plate 92 adapted to close a lower end of the airtight guide tube 76.

The airtight guide tube 76 has a tubular configuration, and accommodates and holds the built-in part 58 in an interior space thereof so as to move the same upwardly and downwardly. The airtight guide tube 76 may have a circular, elliptical or polygonal cross-sectional shape so as to accommodate the built-in part 58.

With this arrangement, the built-in part holding rod 88 can hold the built-in part 58 in the interior space of the airtight guide tube 76 so as to move the same upwardly and downwardly. When the lower end of the parison 70 is held with the upper end of the airtight guide tube 76, it can be made airtight.

The built-in part 58 may be held in the interior space of the airtight guide tube 76 so that built-in parts having various dimensions can be used. By determining the waiting position of the built-in part 58 prior to inserting process in the airtight guide tube 76, the specification of the built-in part 58 can be readily varied.

The lower guide plate 92 has a guide hole 93 so as to slide the built-in part holding rod 88 therethrough. The lower guide plate 92 slides within the airtight guide tube 76 in accordance with the sliding of the built-in part holding rod 88 while sealing the interior of the airtight guide tube 76. A plurality of built-in part holding rods 88 can be provided in accordance with the dimensions of the built-in part 58. The lower guide plate 92 may be attached to the built-in part holding rod 88 so as to be raised and lowered within the airtight guide tube 76 in accordance with the sliding of the built-in part holding rod 88.

As described above, the airtight guide tube 76 has recesses 82 for accommodating the parison expanders 78.

Next, the blow mold 72 will be explained with reference to FIG. 7.

The blow mold 72 is split along a parting line to provide two mold members, and the two mold members are slid leftward and rightward with a blow mold moving unit (not shown), thereby opening the blow mold 72. The blow mold 72 defines a cavity 94 adapted to mold the fuel tank 56 in an interior thereof. In addition, slide cores 96 are slidably provided in the two mold members of the blow mold 72 so as to face the cavity 94.

When the blow mold 72 is closed and the slide cores 96 are retreated, they partly define an inner surface defining the cavity 94, and when the blow mold 72 is opened and the slide cores 96 advance into the cavity 94, they hold the built-in part 58 and the parison 70. The parison 70 is extruded downwardly from the die core 68 provided on the upper side of the blow mold 72.

Figure 16:
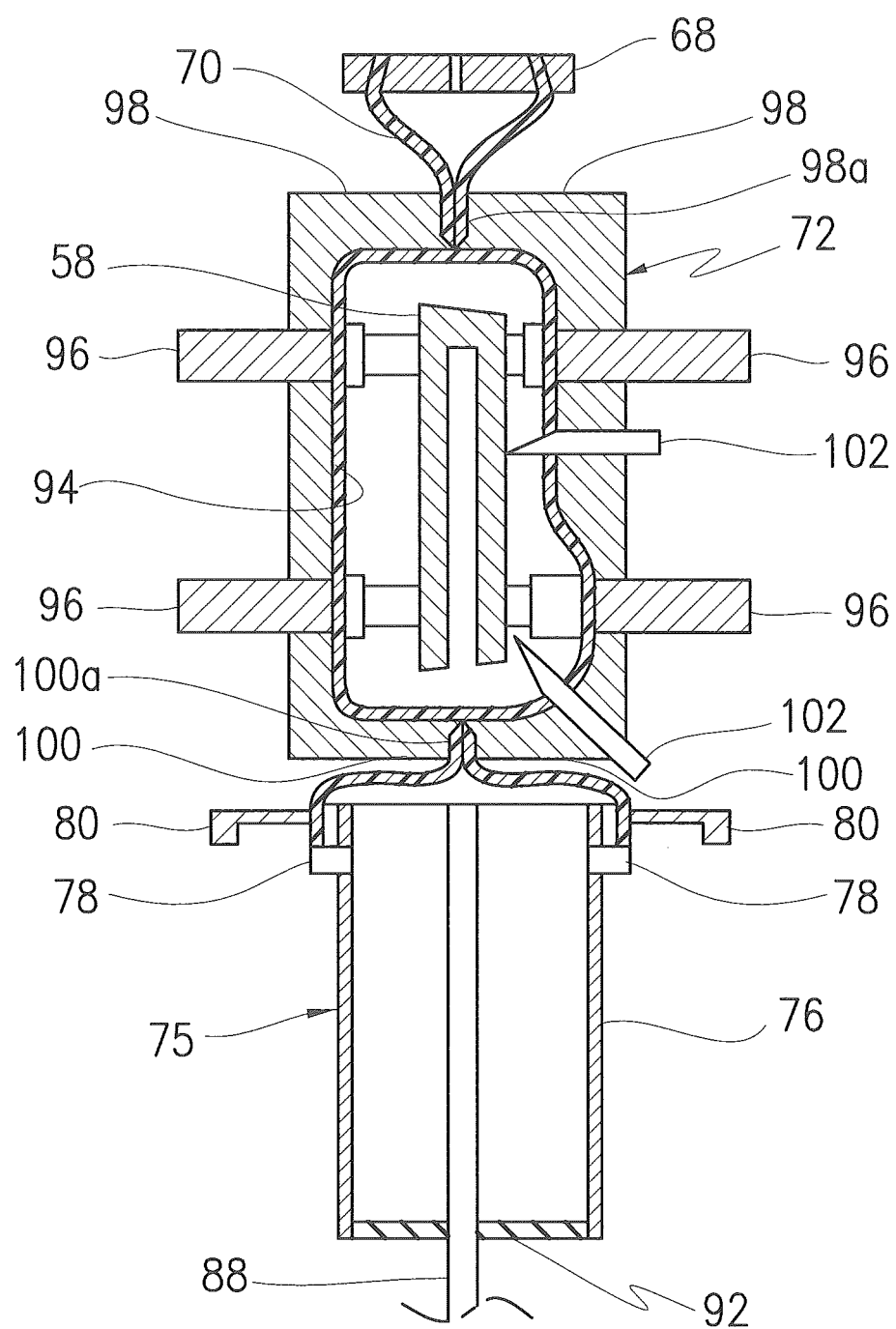
FIG. 16 is a sectional view showing a method of forming a blow molded article with the first embodiment of a blow molding device in accordance with the present invention, which shows a state wherein the built-in part within the parison is held between the slide cores, the blow mold is closed, and blow molding is carried out.

When the blow mold 72 is closed, the two mold members of the blow mold 72 that is split along the parting line, contact each other around the cavity 94. In FIG. 16, they contact each other in upper mating faces 98a of the blow mold 72 and lower mating faces 100a thereof.

Next, the method for forming a fuel tank 56 for an automobile, as a blow molded article, using the first embodiment of the blow molding device in accordance with the present invention will be explained with reference to FIGS. 7 through 16.

The die core 68 is provided on the upper part of the blow mold 72. And, as shown in FIGS. 8 through 16, the parison holding unit 74 is attached on the lower side of the blow mold 72.

Figure 7:
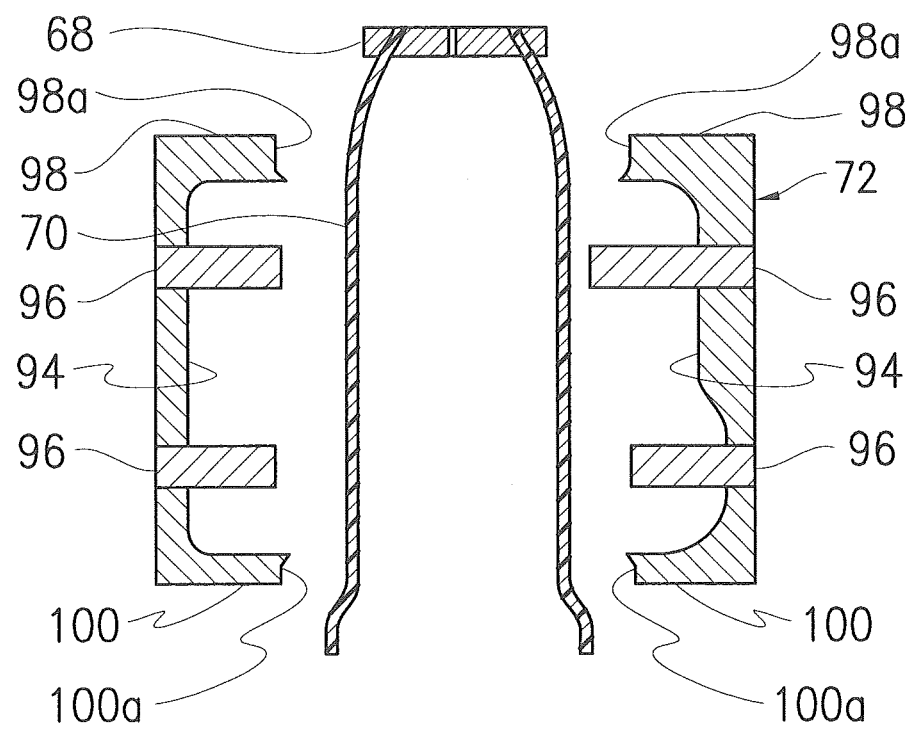
FIG. 7 is a sectional view showing a method of forming a blow molded article with one embodiment of a blow molding device in accordance with the present invention, which shows a state wherein a parison enters an interior space of a blow mold.

In the blow molding process, as shown in FIG. 7, first, the blow mold 72 is opened to open a space defining the cavity 94 thereof, and the parison 70 is extruded from the die core 68 therein. And the lower end of the parison 70 reaches downwardly of a lower end 100 of the blow mold 72.

Figure 8:
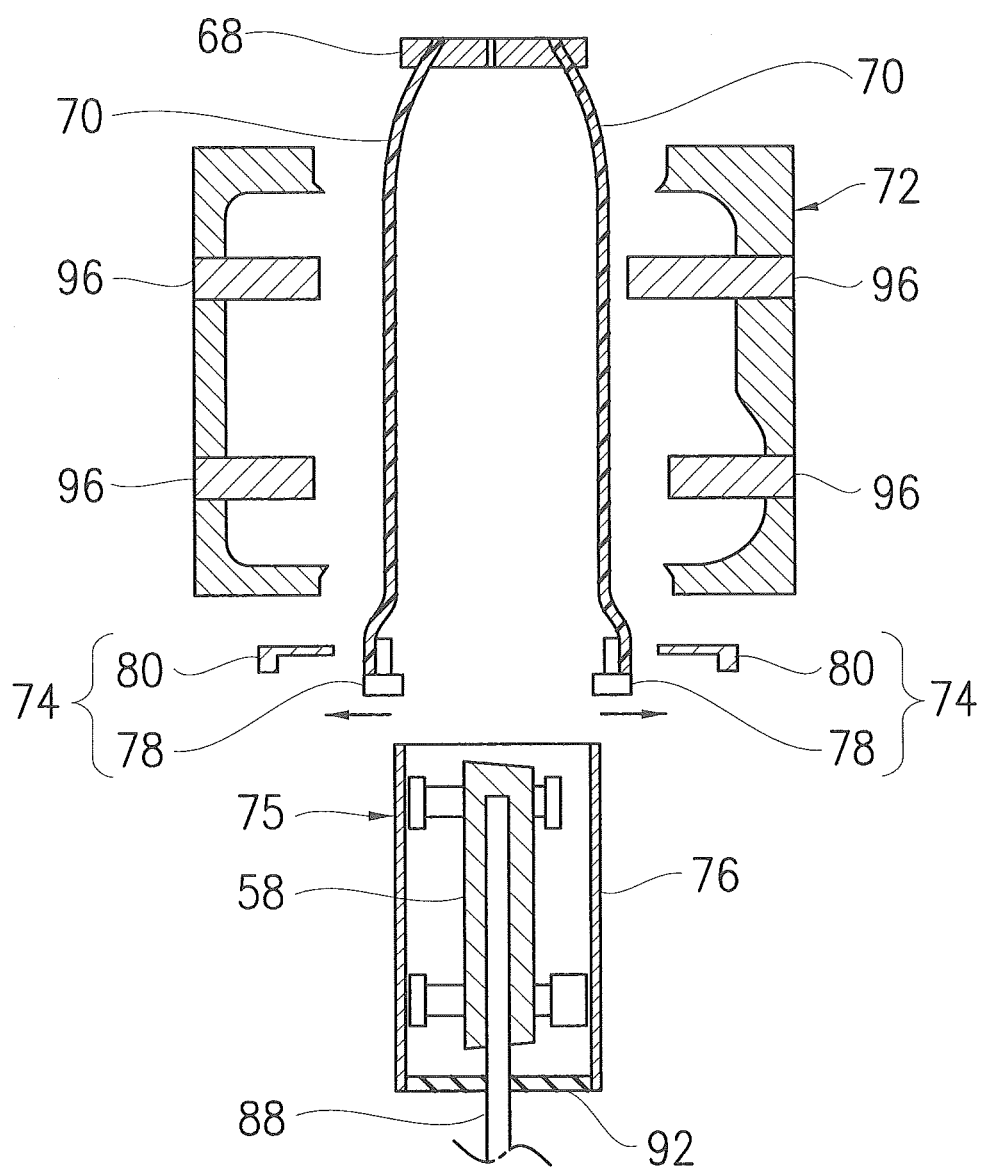
FIG. 8 is a sectional view showing a method of forming a blow molded article with a first embodiment of a blow molding device in accordance with the present invention, which shows a state wherein a lower end of the parison is opened with parison expanders.

Next, as shown in FIG. 8, the parison expanders 78 enter and contact the inner surface of the lower end of the parison 70. Then, as shown by arrows therein, the parison expanders 78 are moved in directions away from the center of the parison 70 to enlarge the lower end of the parison 70.

At this time, the built-in part holding unit 75 holding the built-in part 76 therewithin is located below the lower end of the parison 70.

Figure 9:
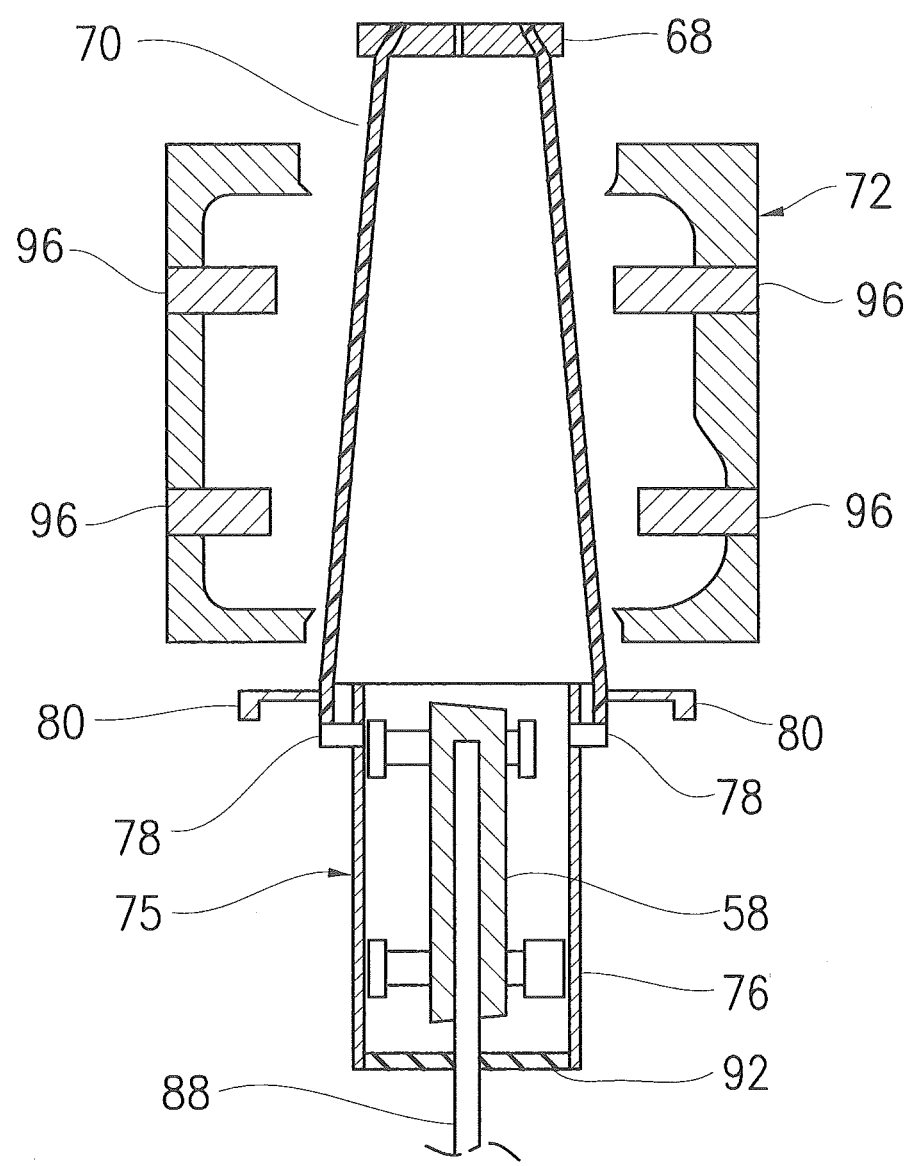
FIG. 9 is a sectional view showing a method of forming a blow molded article with the first embodiment of a blow molding device in accordance with the present invention, which shows a state wherein a lower end of the parison is held between a parison outer holding plate and an upper end of the built-in part airtight guide tube.

Next, as shown in FIG. 9, the upper end of the parison 70 is held with the die core 68 to close an upper end of the parison 70 airtightly.

Then, an upper end of the airtight guide tube 76 is inserted in the interior space of the lower end of the parison 70. And, the parison expanders 78 contact the upper end of the airtight guide tube 76, and are accommodated in the recesses 82 of the airtight guide tube 76. The outer surface of the lower end of the parison 70 is pushed by the parison outer holding plate 80 to move towards the airtight guide tube 76. As a result, the lower end of the parison 70 is held between the parison outer holding plate 80 and the airtight guide tube 76. The parison expanders 78 become integral with the airtight guide tube 76 to hold the inner surface of the lower end of the parison 70. And the lower end of the airtight guide tube 76 is closed with the lower guide plate 92 to make the lower end of the parison 16 airtight.

Figure 10:
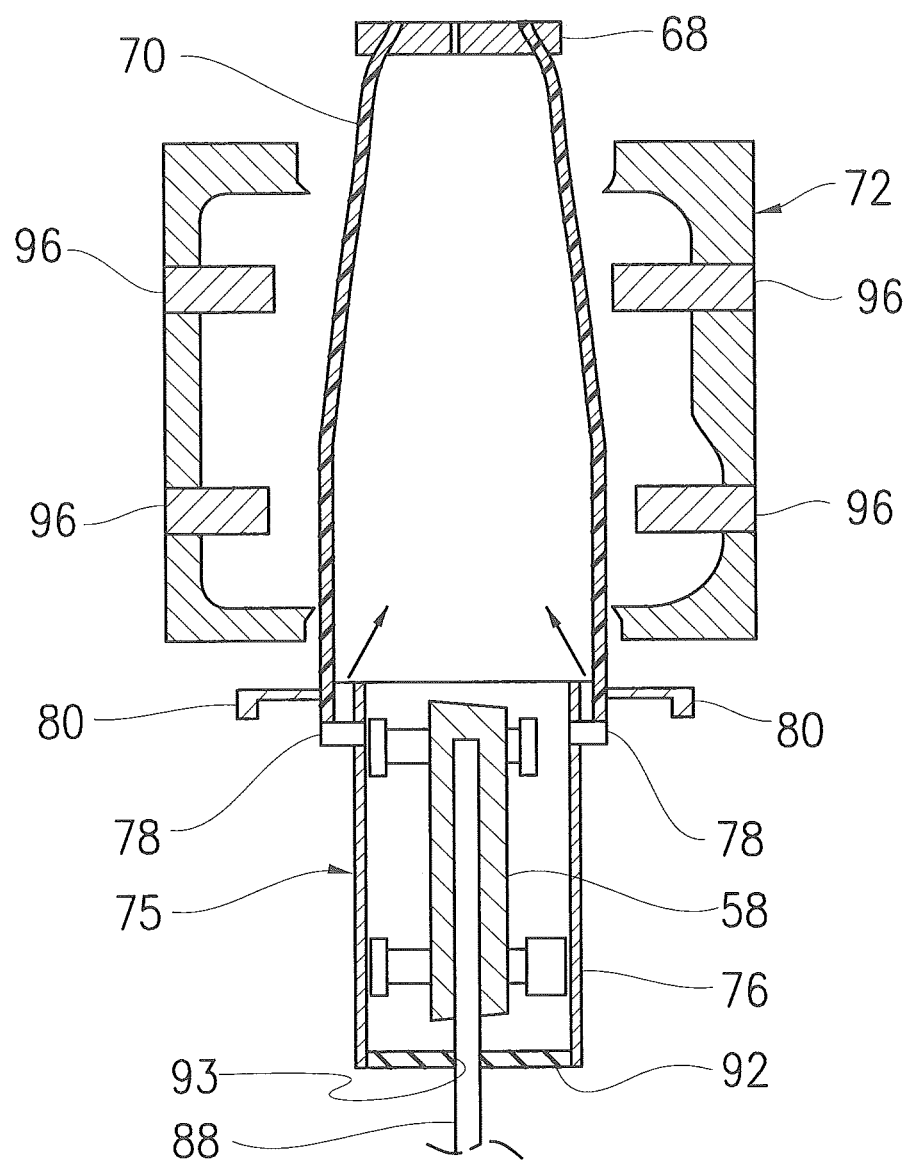
FIG. 10 is a sectional view showing a method of forming a blow molded article with the first embodiment of a blow molding device in accordance with the present invention, which shows a state wherein a lower end of the parison is held between a parison outer holding plate and an upper end of the built-in part airtight guide tube, and pre-blowing is carried out.
Figure 11:
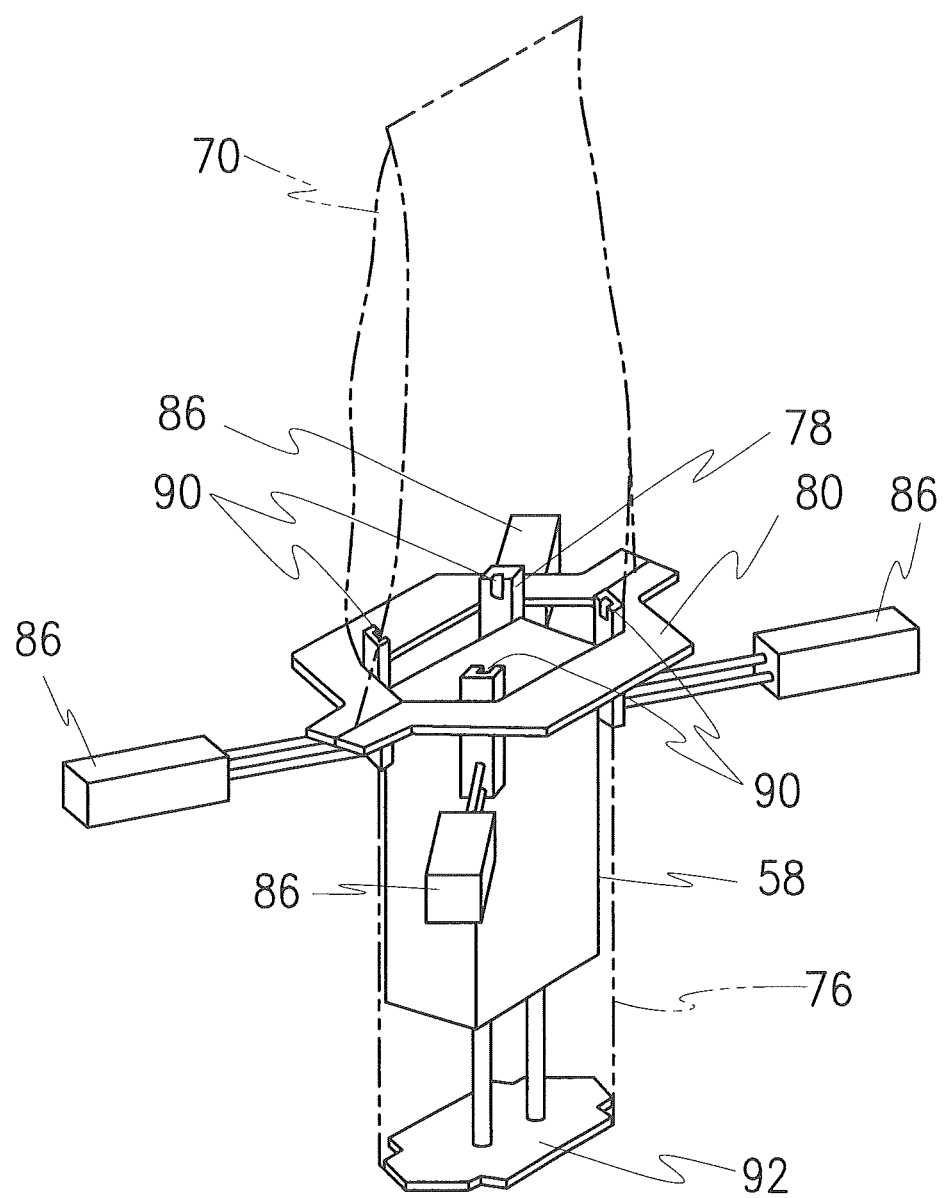
FIG. 11 is a schematic perspective view showing a state wherein the parison holding unit and the built-in part holding unit of the first embodiment of the present invention hold the parison in their upper parts.

Next, as shown in FIGS. 10 through 12, the pre-blowing process is carried out. The pre-blowing process can be performed by blowing gas into the parison 70 from ends of the parison expanders 78 to inflate the parison 70. As shown in FIG. 12, the pre-blowing outlet ports 90 are provided at ends of the parison expanders 78. Gas can be blown into the parison 70 from the pre-blowing outlet ports 90. In the present embodiment, the gas adapted to be blown into the parison 70 is composed of air.

At this time, as described above, the upper end of the parison 70 is closed with the die core 68, whereas the lower end of the parison 70 is closed with the airtight guide tube 76 and the parison expanders 78 to prevent leakage of air. And the lower end of the airtight guide tube 76 is closed with the lower guide plate 92 to prevent leakage of air.

As shown in FIG. 11, the parison expanders 78 are slid with parison cylinders 86.

Figure 13:
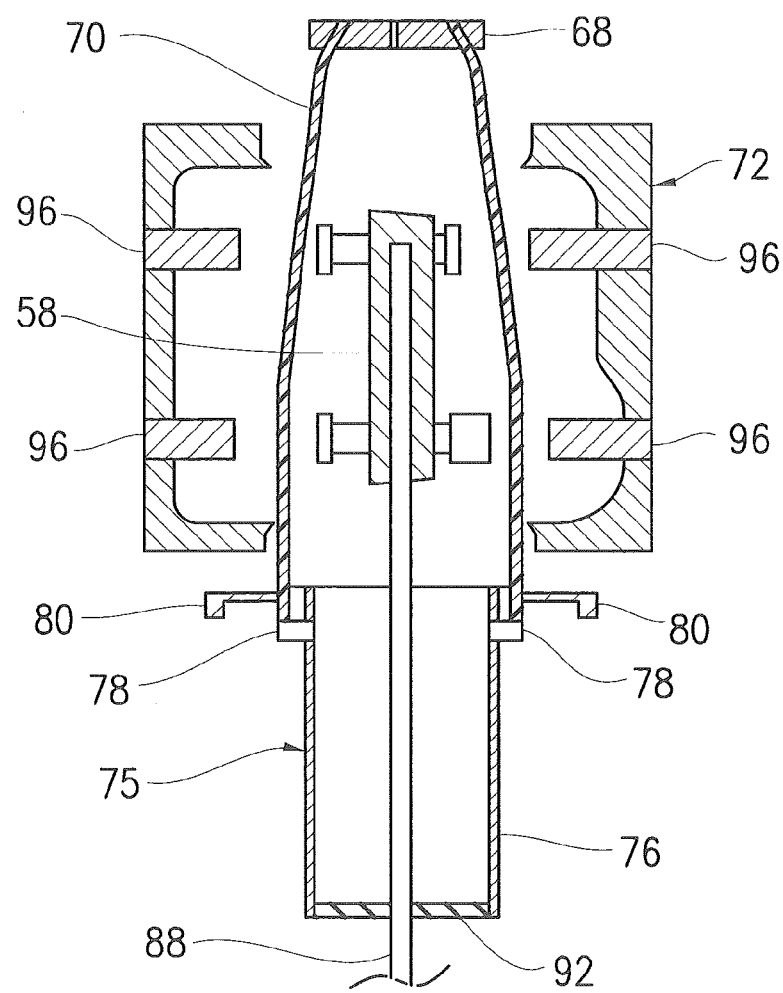
FIG. 13 is a sectional view showing a method of forming a blow molded article with the first embodiment of a blow molding device in accordance with the present invention, which shows a state wherein a built-in part is inserted into the parison from the lower end of the parison.

Next, as shown in FIG. 13, the built-in part holding rod 88 holding the build-in part 58 is slid upwardly from the airtight guide tube 76 into the parison 16 inflated by pre-blowing, and as a result, the built-in part 58 is positioned in the cavity 94 of the blow mold 72. At this time, the parison 70 is inflated by pre-blowing so that the built-in part 58 does not contact the inner wall of the parison 70.

Figure 14:
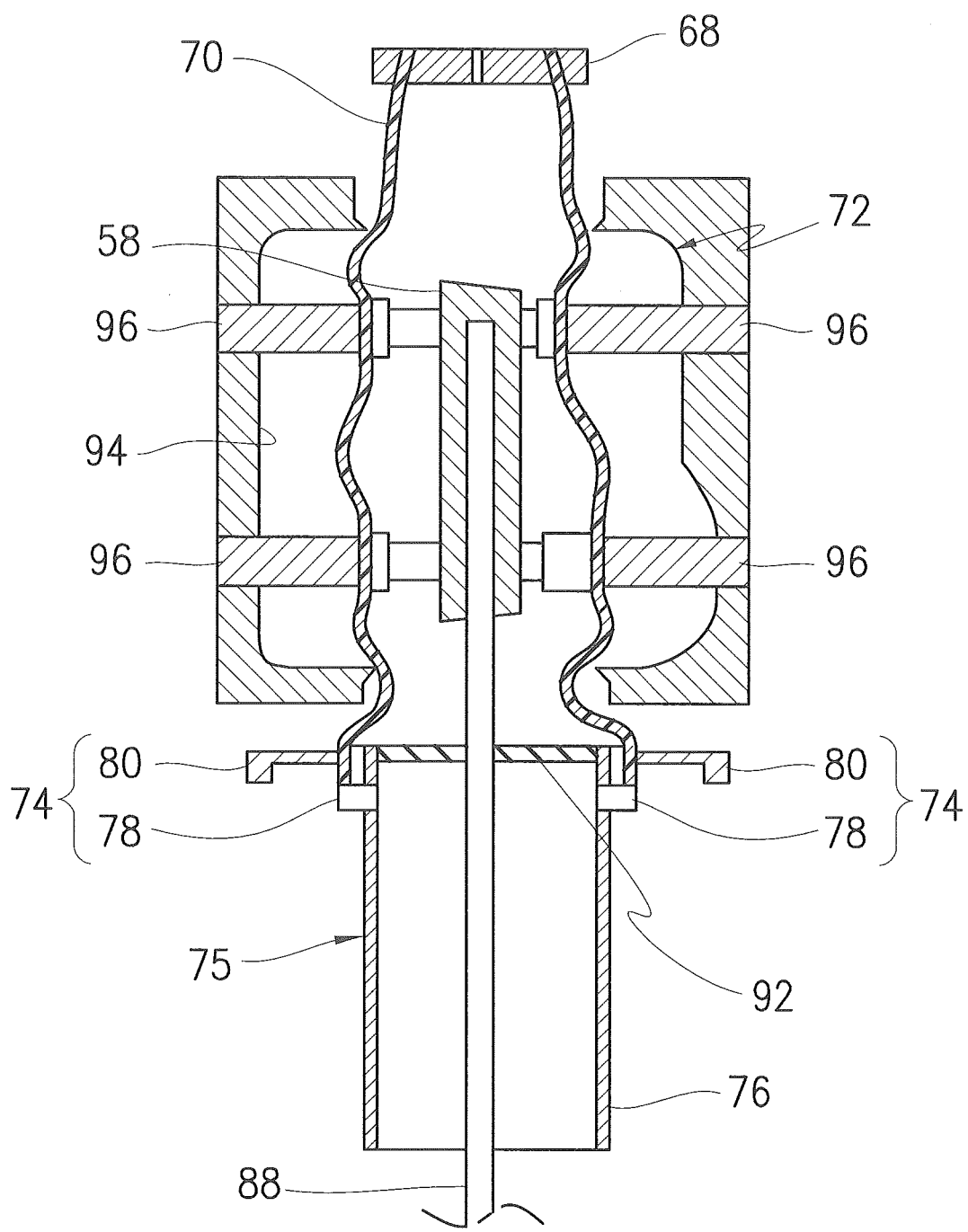
FIG. 14 is a sectional view showing a method of forming a blow molded article with the first embodiment of a blow molding device in accordance with the present invention, which shows a state wherein the built-in part within the parison is held between slide cores.

And, as shown in FIG. 14, the blow mold 72 is slightly closed, and a plurality of slide cores 96 provided in the blow mold 72 are slid. Since the slide cores 96 are provided in the positions facing the built-in part 58, the parison 70 can be pushed with the built-in part 58 and the slide cores 96 while being sandwiched therebetween.

At this time, the lower guide plate 92 is located at the upper end of the airtight guide tube 76 to prevent leakage of air from the interior space of the parison 70.

Since the inner surface of the parison 70 is still in a molten state, the parison 70 can be fused to ends of the built-in part 58. At this time, the built-in part 58 is held with the built-in part holding rod 88 and the slide cores 96 so that the built-in part 58 can be securely attached in a prescribed position of the inner surface of the outer wall of the fuel tank 56.

Figure 15:
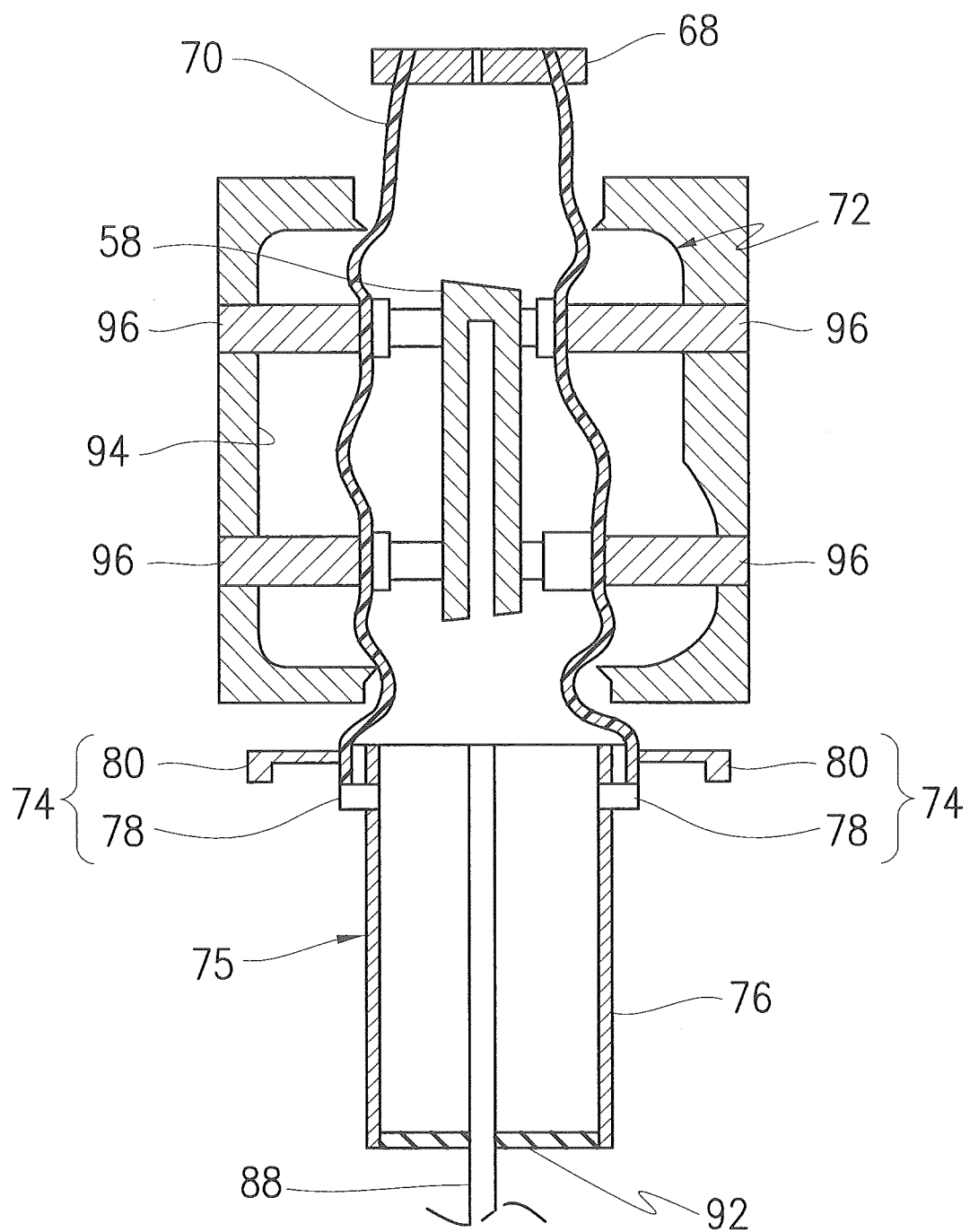
FIG. 15 is a sectional view showing a method of forming a blow molded article with the first embodiment of a blow molding device in accordance with the present invention, which shows a state wherein the built-in part within the parison is held between the slide cores and a built-in part holding rod is removed from the blow mold.

Then, as shown in FIG. 15, the built-in part holding rod 88 is lowered with the built-in part 58 held with the slide cores 96, and is removed from the blow mold 72. Since the built-in part 58 is held with the slide cores 96, the built-in part 58 can be located in a prescribed position. At this time, the lower end of the parison 70 is held and sealed with the parison outer holding plate 80 of the parison holding unit 74, and the lower guide plate 92 is located at the lower end of the airtight guide tube 76 to seal the same so that air is prevented from leaking from the interior space of the parison 70.

Next, as shown in FIG. 16, the blow mold 72 is further closed to completely close the blow mold 72. As a result, an upper part and a lower part of the parison 70 can be closed completely with the blow mold 72.

The upper part and the lower part of the parison 70 can be closed by bringing the upper mating faces 98a and the lower mating faces 100a of the blow mold 72 into close contact with each other. Alternatively, by providing such pinching plates as referred in the prior art between the blow mold 72 and the parison holding unit 74, the upper part or the lower part of the parison 70 may be closed.

Then, the upper and lower ends of the parison 70 are cut with slide cutters (not shown) provided on the upper and lower sides of the blow mold 72. And air is blown from air nozzles 102 into the interior space of the parison 70 to press the outer surface of the parison 70 against the inner surface defining the cavity 94, and consequently, the fuel tank 56 is configured.

At this time, a tip face of each of the slide cores 96 can become flush with the inner surface defining the cavity 94 of the blow mold 72. Next, air is further blown from the air nozzles 102 into the interior space of the parison 70 to press the outer surface of the parison 70 against the blow mold 72 completely. As a result, the fuel tank 56 can be configured completely. And air is circulated in the interior space of the parison 70 to complete the blow molding process. Thereafter, the blow mold 72 is opened, and the fuel tank 56 is removed therefrom.

Hereinafter, a second embodiment of the present invention will be explained with reference to FIG. 17 through FIG. 23. The second embodiment of the present invention differs from the first embodiment in that the built-in part holding unit is formed into a bellows shape so that different points will be explained, but the explanations of similar points will be omitted.

A built-in part holding unit 104 has a cylindrical airtight guide tube 106, a built-in part holding rod 108 adapted to hold the built-in part 58 in an interior space of the airtight guide tube 106 and move upwardly and downwardly so as to insert the built-in part 58 in the parison 70, and a lower guide plate 110 adapted to close a lower end of the airtight guide tube 106.

The airtight guide tube 106 has a tubular configuration, and accommodates and holds the built-in part 58 in an interior space thereof so as to move the built-in part 58 upwardly and downwardly. The airtight guide tube 106 may have a circular, elliptical or polygonal cross-sectional shape so as to accommodate the built-in part 58.

The airtight guide tube 106 has a parison holding section 112 of which an upper part is adapted to contact the lower end of the parison 70 for holding the lower end of the parison 70 with the parison outer holding plate 80 of the parison holding unit 74, and a bellows part 114 is provided in the airtight guide tube 106 between the parison holding section 112 and the lower guide plate 110 so as to extend and contract upwardly and downwardly.

With this arrangement, when the built-in part 58 is attached to the built-in part holding rod 108, and is inserted into the parison 70 by sliding the built-in part holding rod 108, the bellows part 114 of the airtight guide tube 106 can be contracted so that the sliding distance of the built-in part holding rod 108 can be made short. Therefore, a space required for sliding the built-in part holding rod 108 can be made small so that a special pit adapted to accommodate the built-in part holding rod 108 is not required below the built-in part holding unit 104.

The built-in part holding rod 108 holds the built-in part 58 in the interior space of the airtight guide tube 106 so as to move the built-in part 58 upwardly and downwardly. When the lower end of the parison 70 is held with the parison holding section 112 of the airtight guide tube 106, it can be made airtight.

In addition, the built-in part 58 may be held in the interior space of the airtight guide tube 106 so that built-in parts having various dimensions can be used. By determining the waiting position of the built-in part 58 prior to the inserting process in the airtight guide tube 106, the specification of the built-in part 58 can be readily varied.

As described above, the airtight guide tube 106 has recesses 82 for accommodating the parison expanders 78 in the upper end thereof.

Next, the method for forming a fuel tank 56 for an automobile, as a blow molded article, using the second embodiment of the blow molding device in accordance with the present invention will be explained with reference to FIGS. 17 through 23.

The die core 68 is provided on the upper part of the blow mold 72. And, as shown in FIGS. 17 through 23, the parison holding unit 74 is attached on the lower side of the blow mold 72.

Figure 17:
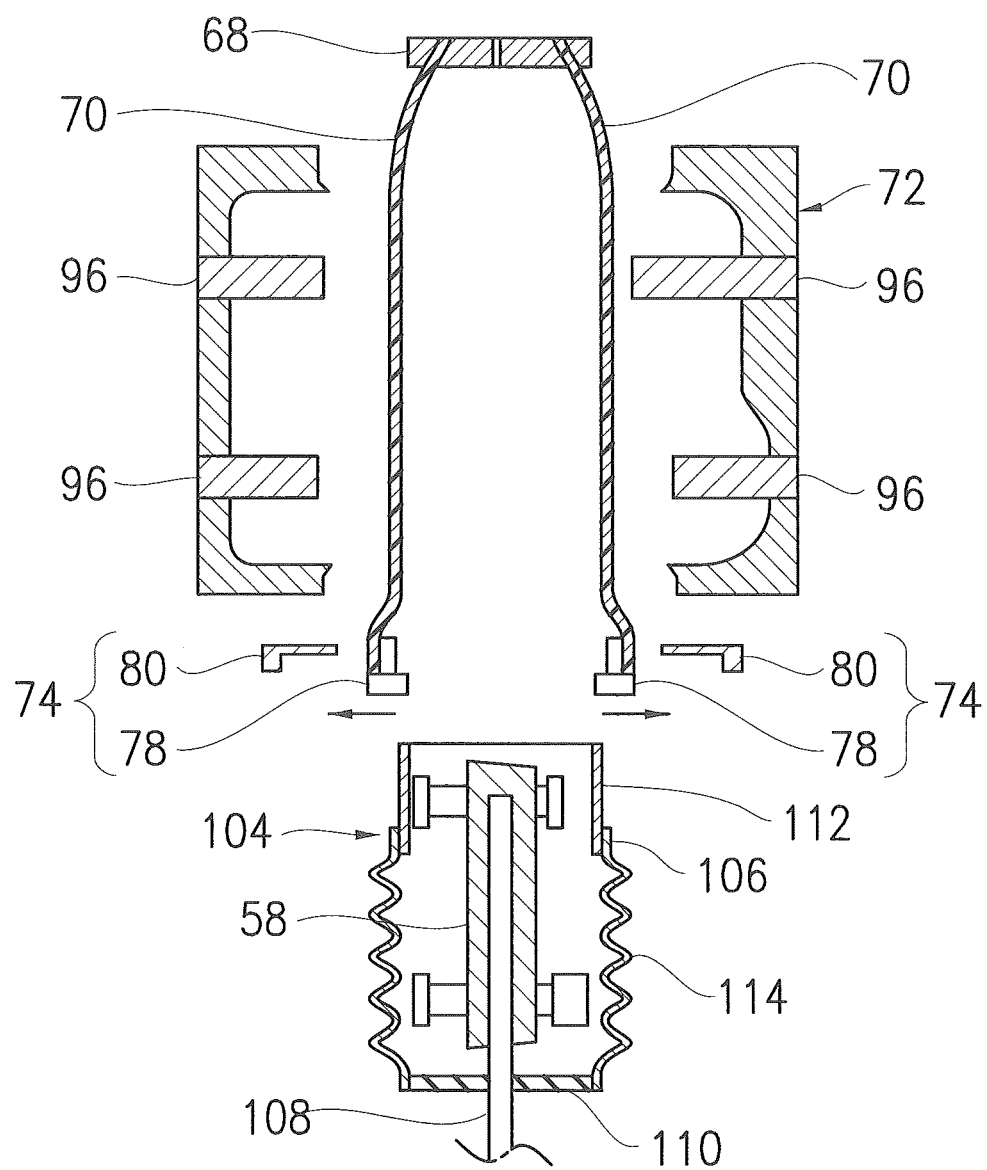
FIG. 17 is a sectional view showing a method of forming a blow molded article with a second embodiment of a blow molding device in accordance with the present invention, which shows a state wherein a lower end of a parison is opened with parison expanders.

As shown in FIG. 17, a plurality of parison expanders 78 enter and contact the inner surface of the lower end of the parison 70. Then, as shown by arrows therein, the parison expanders 78 are moved in directions away from the center of the parison 70 to enlarge the lower end of the parison 70.

At this time, the built-in part holding unit 104 holding the built-in part 58 therewithin is located below the lower end of the parison 70.

Figure 18:
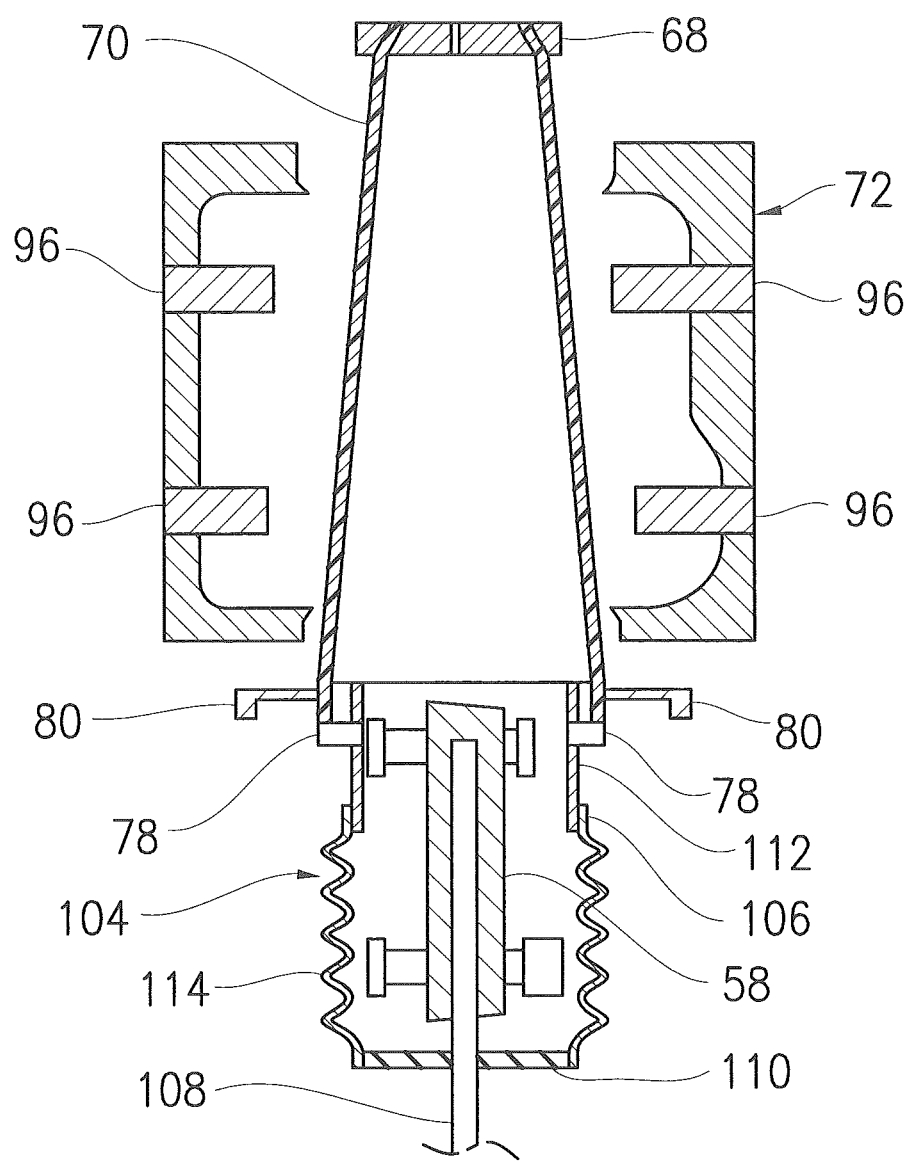
FIG. 18 is a sectional view showing a method of forming a blow molded article with the second embodiment of a blow molding device in accordance with the present invention, which shows a state wherein a lower end of the parison is held between a parison outer holding plate and a parison holding section of a built-in part airtight guide tube.

Next, as shown in FIG. 18, the upper end of the parison 70 is held with the die core 68 to close an upper part of the parison 70 airtightly.

Then, an upper end of the airtight guide tube 106 is inserted in the interior space of the lower end of the parison 70. And, the parison expanders 78 contact the parison holding section 112 of the airtight guide tube 106, and are accommodated in the recesses 82 of the airtight guide tube 106. The outer surface of the lower end of the parison 70 is pushed by the parison outer holding plate 80 to move towards the airtight guide tube 76. As a result, the lower end of the parison 70 is held between the parison outer holding plate 80 and the airtight guide tube 106. The parison expanders 78 become integral with the airtight guide tube 106 to hold the inner surface of the lower end of the parison 70. And the lower end of the airtight guide tube 106 is closed with the lower guide plate 110 to make the lower end of the parison 70 airtight.

Figure 19:
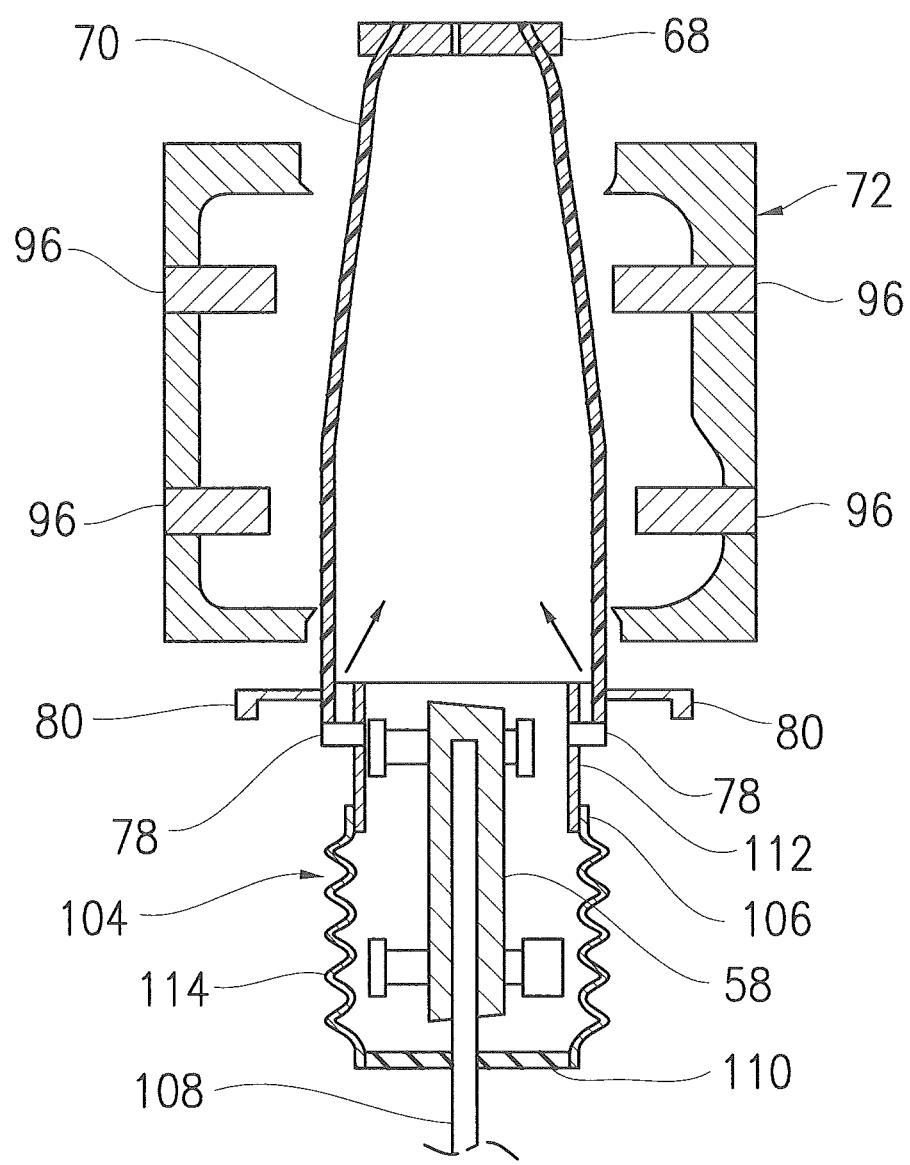
FIG. 19 is a sectional view showing a method of forming a blow molded article with the second embodiment of a blow molding device in accordance with the present invention, which shows a state wherein a lower end of the parison is held between the parison outer holding plate and an upper end of the built-in part airtight guide tube, and pre-blowing is carried out.

Next, as shown in FIG. 19, the pre-blowing process is carried out. The pre-blowing process can be performed by blowing gas into the parison 70 from ends of the parison expanders 78 to inflate the parison 70. As shown in FIG. 12, the pre-blowing outlet ports 90 are provided at ends of the parison expanders 78. Gas can be blown into the parison 70 from the pre-blowing outlet ports 90. In the present embodiment, the gas adapted to be blown into the parison 70 is composed of air.

At this time, as described above, the upper part of the parison 70 is closed with the die core 68, whereas the lower part of the parison 70 is closed with the airtight guide tube 106 and the parison expanders 78 to prevent leakage of air. And the lower part of the airtight guide tube 106 is closed with the lower guide plate 110 to prevent leakage of air.

Figure 20:
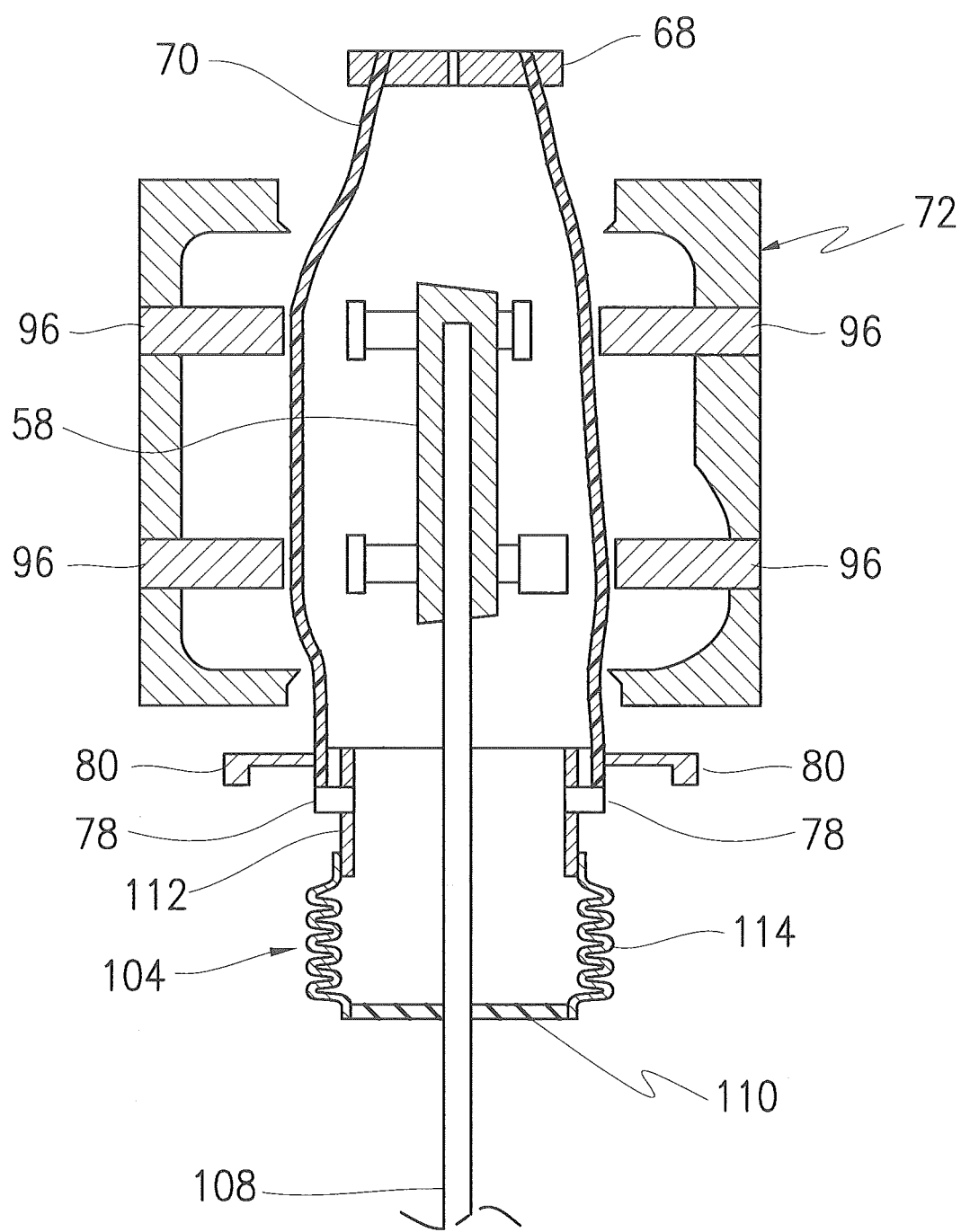
FIG. 20 is a sectional view showing a method of forming a blow molded article with the second embodiment of a blow molding device in accordance with the present invention, which shows a state wherein a built-in part is inserted into the parison from the lower end of the parison.

Next, as shown in FIG. 20, the built-in part holding rod 108 holding the build-in part 58 is slid upwardly from the airtight guide tube 106 into the parison 70 inflated by the pre-blowing process, and as a result, the built-in part 58 is positioned in the position of the cavity 94 of the blow mold 72. At this time, the parison 70 is inflated by the pre-blowing process so that the built-in part 58 does not contact the inner wall of the parison 70.

When the built-in part holding rod 108 is slid to hold the build-in part 58 in the position facing the cavity 94 of the blow mold 72, the bellows part 114 of the airtight guide tube 106 is compressed to feed air within the airtight guide tube 106 into the parison 70, and a second pre-blowing process can be performed. As a result, the parison 70 can be further inflated. By expanding the parison with two-stage pre-blowing process, the built-in part 58 can be inserted into the parison 70 more securely without contacting the parison 70.

Figure 21:
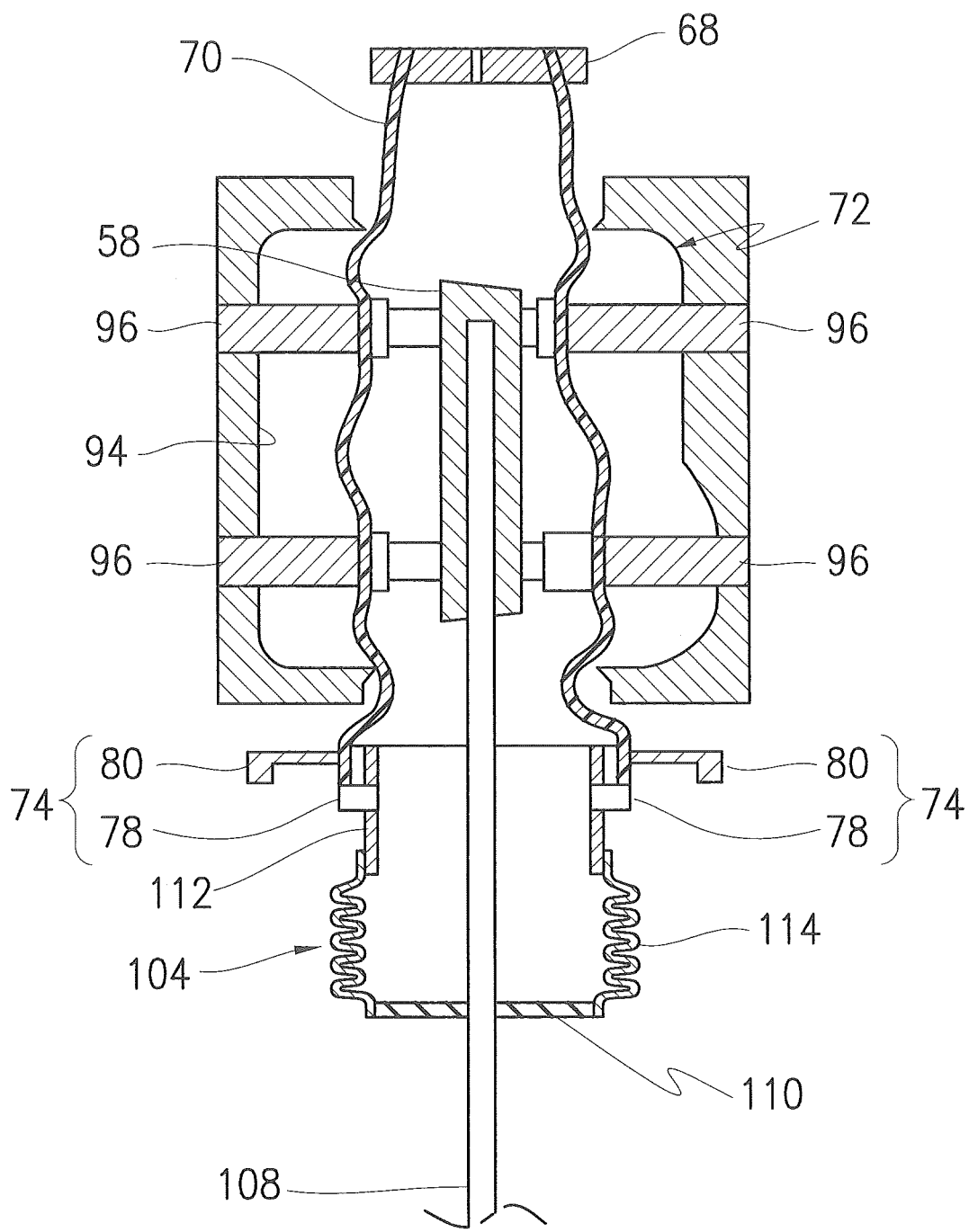
FIG. 21 is a sectional view showing a method of forming a blow molded article with the second embodiment of a blow molding device in accordance with the present invention, which shows a state wherein the built-in part within the parison is held between slide cores.

And, as shown in FIG. 21, the blow mold 72 is slightly closed, and a plurality of slide cores 96 provided in the blow mold 72 are slid. Since the slide cores 96 are provided in the positions facing the built-in part 58, the parison 70 can be pushed with the built-in part 58 and the slide cores 96 while being sandwiched therebetween.

At this time, the lower guide plate 110 is located at the lower end of the airtight guide tube 106 to prevent leakage of air from the interior space of the parison 70.

Since the inner surface of the parison 70 is still in a molten state, the parison 70 can be fused to ends of the built-in part 58. At this time, the built-in part 58 is held with the built-in part holding rod 108 and the slide cores 96 so that the built-in part 58 can be securely attached to a prescribed position of the inner surface of the outer wall of the fuel tank 56.

Figure 22:
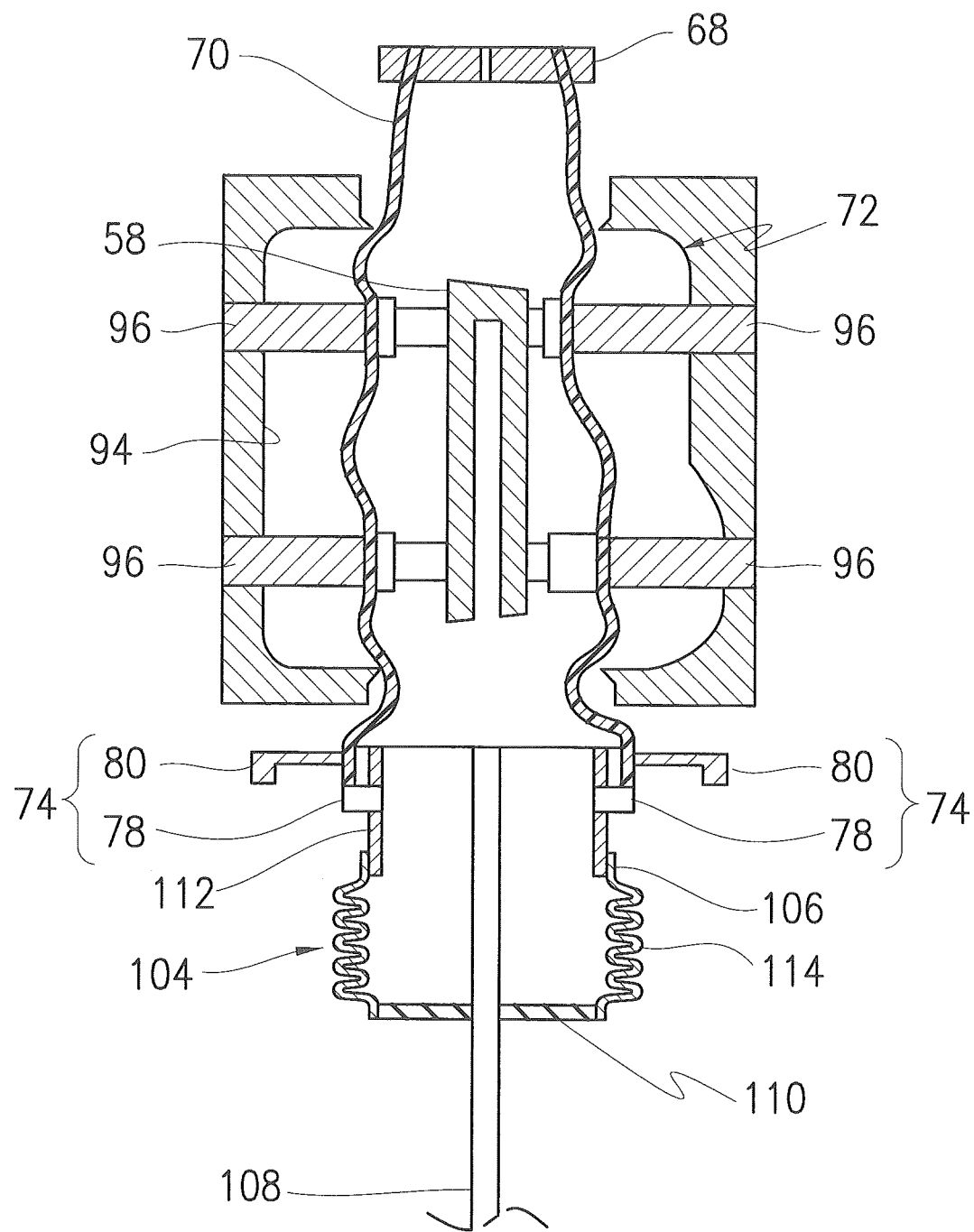
FIG. 22 is a sectional view showing a method of forming a blow molded article with the second embodiment of a blow molding device in accordance with the present invention, which shows a state wherein the built-in part within the parison is held between the slide cores and a built-in part holding rod is removed from the blow mold.

Then, as shown in FIG. 22, the built-in part holding rod 108 is lowered with the built-in part 58 held with the slide cores 96, and is removed from the blow mold 72. Since the built-in part 58 is held with the slide cores 96, the built-in part 58 can be located in a prescribed position. At this time, the lower end of the parison 70 is held and sealed with the parison outer holding plate 110 of the parison holding unit 74, and the lower guide plate 110 is located at the lower end of the airtight guide tube 106 to seal the same so that air is prevented from leaking from the interior space of the parison 70.

Figure 23:
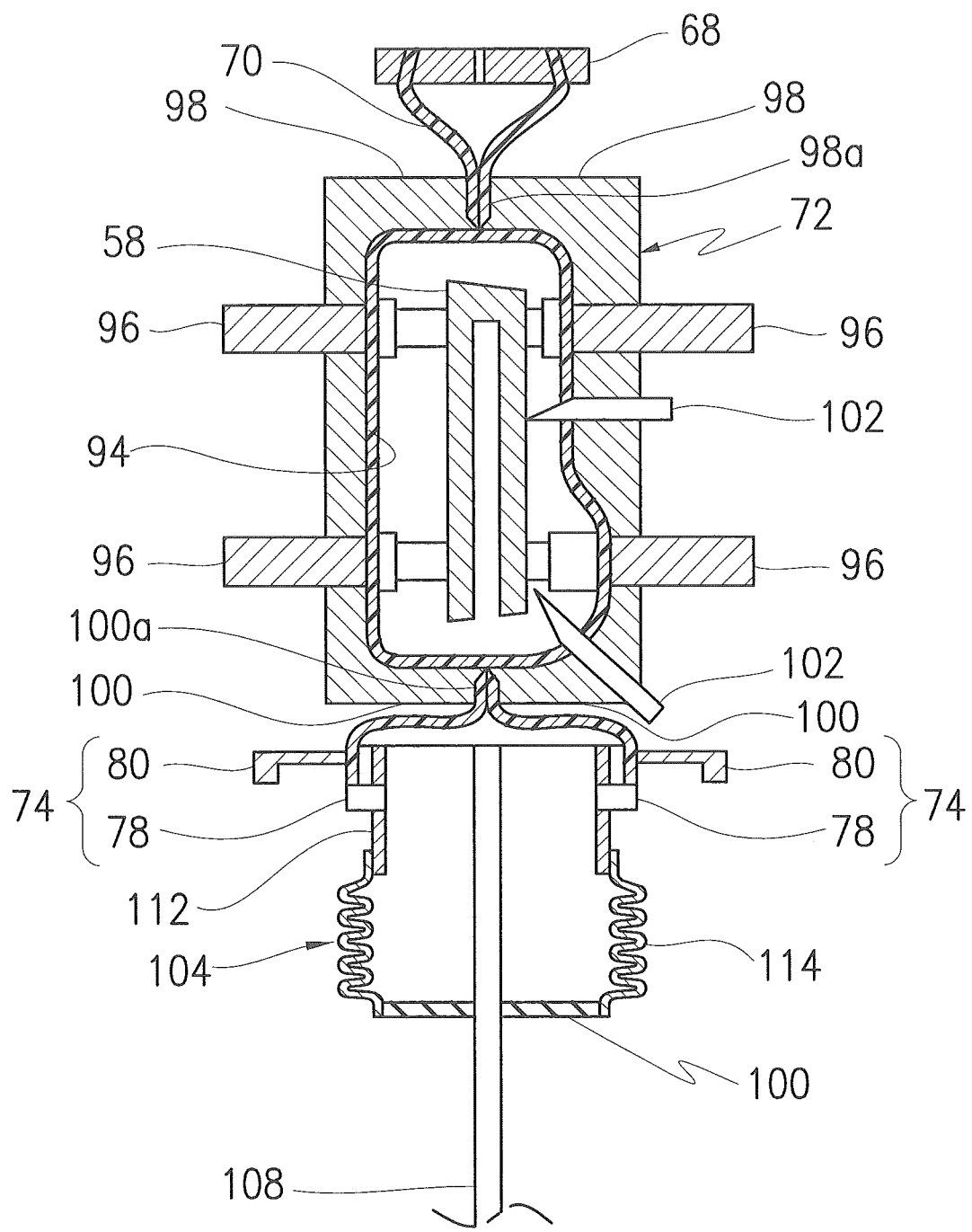
FIG. 23 is a sectional view showing a method of forming a blow molded article with the second embodiment of a blow molding device in accordance with the present invention, which shows a state wherein the built-in part within the parison is held between the slide cores, the blow mold is closed, and blow molding is carried out.

Next, as shown in FIG. 23, the blow mold 72 is further closed to close the blow mold 72 completely. As a result, an upper end and a lower end of the parison 70 can be closed completely with the blow mold 72.

The upper end and the lower end of the parison 70 can be closed by bringing the upper mating faces 98a and the lower mating faces 100a of the blow mold 72 into close contact with each other. Alternatively, by providing such pinching plates as referred in the prior art between the blow mold 72 and the parison holding unit 74, the upper part or the lower part of the parison 70 may be closed.

Then, the upper and lower ends of the parison 70 are cut with slide cutters (not shown) provided on the upper and lower sides of the blow mold 72. And air is blown from air nozzles 102 into the interior space of the parison 70 to press the outer surface of the parison 70 against the inner surface defining the cavity 94, and consequently, the fuel tank 56 is configured.

At this time, a tip face of each of the slide cores 96 can become flush with the inner surface defining the cavity 94 of the blow mold 72. Next, air is further blown from the air nozzles 102 into the interior space of the parison 70 to press the outer surface of the parison 70 against the blow mold 72 completely. As a result, the fuel tank 56 can be configured completely. And air is circulated in the interior space of the parison 70 to complete the blow molding process. Thereafter, the blow mold 72 is opened to remove the fuel tank 56 therefrom.

While the invention has been described in connection with what are considered to be the preferred embodiments, it is to be understood that the invention is not limited to the disclosed embodiments, but, on the contrary, is intended to cover various modifications and equivalent arrangements included within the spirit and scope of the appended claims.

What is claimed is:

1. A blow molding method for forming a blow molded article having a built-in part in an interior space thereof, wherein said blow molding method uses a die core adapted to extrude a parison, a blow mold adapted to form an outer wall of the blow molded article, a parison holding unit adapted to hold a lower end of the parison, and a built-in part holding unit adapted to hold the built-in part prior to blow molding, wherein
  said blow mold includes two mold members split along a parting line thereof, said two mold members define a cavity adapted to form the blow molded article in split faces thereof, slide cores are provided in an inner surface of said blow mold so as to be slid inwardly and outwardly of said cavity,
  said parison holding unit includes a plurality of parison expanders adapted to be inserted in an interior space of the lower end of the parison, and a parison outer holding plate adapted to hold an outer surface of the lower end of the parison, each of said parison expanders is attached so as to slide outwardly from a center of the parison,
  said built-in part holding unit includes an airtight guide tube adapted to hold the built-in part therein, a holding rod adapted to hold the built-in part in said airtight guide tube so as to slide the built-in part upwardly and downwardly, and a lower guide plate having a hole through which said holding rod is slidable, and adapted to close said airtight guide tube, and
  the blow molding method includes opening said blow mold along said parting line, dropping the parison from said die core in said cavity that is opened, expanding the lower end of the parison with said plurality of parison expanders, inserting an upper end of said airtight guide tube into the lower end of the parison, holding the lower end of the parison with said upper end of said airtight guide tube and said parison outer holding plate, holding the parison in an airtight condition with said die core and said parison outer holding plate, inserting gas into the parison to inflate the same to carry out pre-blowing, holding the built-in part with said holding rod from said airtight guide tube, positioning the built-in part in a position facing said cavity, closing said blow mold to hold the parison and the built-in part with said slide cores, removing said holding rod from said blow mold, closing said blow mold completely, holding an upper part and a lower part of the parison with an upper end and a lower end of said blow mold, and blowing gas into the parison, thereby forming said blow molded article at a time after the pre-blowing,
  wherein said airtight guide tube includes a parison holding section of which an upper part is adapted to contact the lower end of the parison for holding the lower end of the parison with the parison holding unit, and a bellows part is provided in said airtight guide tube between said parison holding section and said lower guide plate so as to be extendable and contractable upwardly and downwardly, and
  wherein the blow molding method includes opening said blow mold is along the parting line, dropping the parison from said die core in an open part of said cavity, and inserting said parison holding section of said airtight guide tube into the lower end of the parison, holding the lower end of the parison with said parison holding section of said airtight guide tube and said parison holding unit, inserting gas into the parison to inflate the parison, thereby carrying out pre-blowing, compressing said bellows part of said airtight guide tube, sliding said built-in part holding rod to position the built-in part in the interior space of the parison from said airtight guide tube, and holding the built-in part in the position facing said cavity,
  the method further comprising feeding air within said airtight guide tube into the parison when said bellows part of said airtight guide tube is compressed to position the built-in part in the position facing said cavity, thereby further inflating the parison.

2. The blow molding method as claimed in claim 1, further comprising splitting said outer holding plate into two split plates so as to be moved by a cylinder toward an end face of said airtight guide tube to contact the same.

3. A blow molding method for forming a blow molded article having a built-in part in an interior space thereof, wherein said blow molding method uses a die core adapted to extrude a parison, a blow mold adapted to form an outer wall of the blow molded article, a parison holding unit adapted to hold a lower end of the parison, and a built-in part holding unit adapted to hold the built-in part prior to blow molding, wherein
  said blow mold includes two mold members split along a parting line thereof, said two mold members define a cavity adapted to form the blow molded article in split faces thereof, slide cores are provided in an inner surface of said blow mold so as to be slid inwardly and outwardly of said cavity,
  said parison holding unit includes a plurality of parison expanders adapted to be inserted in an interior space of the lower end of the parison, and a parison outer holding plate adapted to hold an outer surface of the lower end of the parison, each of said parison expanders is attached so as to slide outwardly from a center of the parison,
  said built-in part holding unit includes an airtight guide tube adapted to hold the built-in part therein, a holding rod adapted to hold the built-in part in said airtight guide tube so as to slide the built-in part upwardly and downwardly, and a lower guide plate having a hole through which said holding rod is slidable, and adapted to close said airtight guide tube, and
  the blow molding method includes opening said blow mold along said parting line, dropping the parison from said die core in said cavity that is opened, expanding the lower end of the parison with said plurality of parison expanders, inserting an upper end of said airtight guide tube into the lower end of the parison, holding the lower end of the parison with said upper end of said airtight guide tube and said parison outer holding plate, holding the parison in an airtight condition with said die core and said parison outer holding plate, inserting gas into the parison to inflate the same to carry out pre-blowing, holding the built-in part with said holding rod from said airtight guide tube, positioning the built-in part in a position facing said cavity, closing said blow mold to hold the parison and the built-in part with said slide cores, removing said holding rod from said blow mold, closing said blow mold completely, holding an upper part and a lower part of the parison with an upper end and a lower end of said blow mold, and blowing gas into the parison, thereby forming said blow molded article at a time after the pre-blowing, the method further comprising injecting gas from pre-blow injection ports provided at upper ends of said parison expanders after the lower end of the parison is held between said upper end of said airtight guide tube and said parison outer holding plate, thereby carrying out pre-blowing.

4. A blow molding method for forming a blow molded article having a built-in part in an interior space thereof, wherein said blow molding method uses a die core adapted to extrude a parison, a blow mold adapted to form an outer wall of the blow molded article, a parison holding unit adapted to hold a lower end of the parison, and a built-in part holding unit adapted to hold the built-in part prior to blow molding, wherein said blow mold includes two mold members split along a parting line thereof, said two mold members define a cavity adapted to form the blow molded article in split faces thereof, slide cores are provided in an inner surface of said blow mold so as to be slid inwardly and outwardly of said cavity, said parison holding unit includes a plurality of parison expanders adapted to be inserted in an interior space of the lower end of the parison, and a parison outer holding plate adapted to hold an outer surface of the lower end of the parison, each of said parison expanders is attached so as to slide outwardly from a center of the parison, said built-in part holding unit includes an airtight guide tube adapted to hold the built-in part therein, a holding rod adapted to hold the built-in part in said airtight guide tube so as to slide the built-in part upwardly and downwardly, and a lower guide plate having a hole through which said holding rod is slidable, and adapted to close said airtight guide tube, and the blow molding method includes opening said blow mold along said parting line, dropping the parison from said die core in said cavity that is opened, expanding the lower end of the parison with said plurality of parison expanders, inserting an upper end of said airtight guide tube into the lower end of the parison, holding the lower end of the parison with said upper end of said airtight guide tube and said parison outer holding plate, holding the parison in an airtight condition with said die core and said parison outer holding plate, inserting gas into the parison to inflate the same to carry out pre-blowing, holding the built-in part with said holding rod from said airtight guide tube, positioning the built-in part in a position facing said cavity, closing said blow mold to hold the parison and the built-in part with said slide cores, removing said holding rod from said blow mold, closing said blow mold completely, holding an upper part and a lower part of the parison with an upper end and a lower end of said blow mold, and blowing gas into the parison, thereby forming said blow molded article at a time after the pre-blowing, the method further comprising forming recesses adapted to accommodate said parison expanders at said upper end of said airtight guide tube such that after said parison expanders are accommodated in said recesses of said airtight guide tube with a slide mechanism, said upper end of said airtight guide tube and said parison expanders contact an inner surface of the parison, whereas said outer holding plate contacts an outer surface of the parison, thereby holding an outer surface of the lower end of the parison.

* * * * *